United States Patent
Bronstein et al.

(10) Patent No.: US 7,623,687 B2
(45) Date of Patent: ***Nov. 24, 2009

(54) THREE-DIMENSIONAL FACE RECOGNITION

(75) Inventors: Alexander Bronstein, Haifa (IL); Michael Bronstein, Haifa (IL); Ron Kimmel, Haifa (IL)

(73) Assignee: Technion Research & Development Foundation Ltd., Haifa (IL)

( * ) Notice: Subject to any disclaimer, the term of this patent is extended or adjusted under 35 U.S.C. 154(b) by 433 days.

This patent is subject to a terminal disclaimer.

(21) Appl. No.: 11/218,597

(22) Filed: Sep. 6, 2005

(65) Prior Publication Data

US 2006/0251298 A1    Nov. 9, 2006

Related U.S. Application Data

(63) Continuation of application No. 10/284,281, filed on Oct. 31, 2002, now Pat. No. 6,947,579.

(60) Provisional application No. 60/416,243, filed on Oct. 7, 2002.

(51) Int. Cl.
*G06K 9/00* (2006.01)

(52) U.S. Cl. .................. 382/118; 345/419; 345/428; 345/441; 382/154; 382/225; 382/299

(58) Field of Classification Search ........... 345/419, 345/420, 428, 441; 382/118, 225, 274, 299; 706/15, 20

See application file for complete search history.

(56) References Cited

U.S. PATENT DOCUMENTS 5,164,992 A    11/1992   Turk et al.

| 5,181,259 A | 1/1993 | Rorvig |
| 5,689,575 A | 11/1997 | Sako et al. |
| 5,933,527 A | 8/1999 | Ishikawa |
| 6,016,148 A | 1/2000 | Kang et al. |

(Continued)

FOREIGN PATENT DOCUMENTS

| EP | 1039417 | 9/2000 |
| WO | WO 2004/044689 | 5/2004 |

OTHER PUBLICATIONS

Gold et al. "Problems With Handling Spatial Data—The Voronoi Approach", CISM Journal ACSGC, 45(1): 65-80, 1991.

(Continued)

*Primary Examiner*—Gregory M Desire

(57) ABSTRACT

Apparatus for obtaining 3-Dimensional data of a geometric body for matching, and particularly for use in facial matching, comprises a three dimensional scanner for obtaining three-dimensional topographical data of the body, a triangulator for receiving or forming said data into a triangulated manifold, a geodesic converter, for converting the triangulated manifold into a series of geodesic distances between pairs of points of the manifold, and a multi-dimensional scaler, for forming a low dimensional Euclidean representation of the series of geodesic distances, to give a bending invariant representation of the geometric body. In one variant, matching is carried out by taking the principle eigenvalues from the representation and plotting as co-ordinates in a feature space. Tilted or different expression versions of the same face tend to form clusters in the feature space allowing for matching. The apparatus preferably uses the fast marching method for the triangulated domain to obtain the geodesic distances.

27 Claims, 17 Drawing Sheets

U.S. PATENT DOCUMENTS

| | | | |
|---|---|---|---|
| 6,028,960 | A | 2/2000 | Graf et al. |
| 6,031,539 | A | 2/2000 | Kang et al. |
| 6,047,078 | A | 4/2000 | Kang |
| 6,081,739 | A | 6/2000 | Lemchen |
| 6,091,836 | A | 7/2000 | Takano et al. |
| 6,163,322 | A | 12/2000 | LaChapelle |
| 6,272,231 | B1 | 8/2001 | Maurer et al. |
| 6,285,805 | B1 | 9/2001 | Gueziec |
| 6,295,785 | B1 * | 10/2001 | Herrmann ............... 52/745.08 |
| 6,381,346 | B1 | 4/2002 | Eraslan |
| 6,384,826 | B1 | 5/2002 | Bern et al. |
| 6,526,161 | B1 | 2/2003 | Yan |
| 6,539,126 | B1 | 3/2003 | Socolinsky et al. |
| 6,556,196 | B1 | 4/2003 | Blanz et al. |
| 6,571,227 | B1 | 5/2003 | Agrafiotis et al. |
| 6,628,280 | B2 | 9/2003 | Perry et al. |
| 6,671,391 | B1 | 12/2003 | Zhang et al. |
| 6,677,949 | B1 | 1/2004 | Gioia |
| 6,728,404 | B1 | 4/2004 | Ono et al. |
| 6,731,287 | B1 | 5/2004 | Erdem |
| 6,807,290 | B2 | 10/2004 | Liu et al. |
| 6,982,710 | B2 * | 1/2006 | Salomie ..................... 345/420 |
| 7,039,621 | B2 * | 5/2006 | Agrafiotis et al. ............ 706/20 |
| 7,379,602 | B2 * | 5/2008 | Yang ........................ 382/225 |
| 2003/0063801 | A1 * | 4/2003 | Rubinstenn et al. ......... 382/190 |
| 2004/0008809 | A1 * | 1/2004 | Webber ........................ 378/8 |
| 2004/0076313 | A1 | 4/2004 | Bronstein et al. |
| 2004/0175039 | A1 | 9/2004 | Miller |
| 2005/0041867 | A1 | 2/2005 | Loy et al. |
| 2005/0162419 | A1 | 7/2005 | Kim et al. |
| 2005/0180613 | A1 | 8/2005 | Bronstein et al. |
| 2006/0115157 | A1 | 6/2006 | Mori et al. |
| 2006/0188144 | A1 | 8/2006 | Sasaki et al. |
| 2007/0052726 | A1 | 3/2007 | Wright et al. |
| 2009/0028442 | A1 * | 1/2009 | Kimmel et al. ............ 382/218 |

OTHER PUBLICATIONS

Sethian "Fast Marching Methods", SIAM Review, 41(2): 199-235, 1999.

Gordon "Face Recognition From Frontal and Profile Views", Intl. Workshop on Automatic Face and Gesture Recognition, Zurich, 1995.

Beumier et al. "Automatic Face Identification", Proc. SPIE., 2564: 311-323, Applications of Digital Image Processing XVIII, 1995. Abstract.

Beumier et al. "Automatic Face Authentication From 3D Surface", British Machine Vision Conference BMVC 98, Univ. Southampton, UK, p. 449-458, 1998.

Bronstein et al. "Three-Dimensional Face Recognition", URL: http://www.cs.technion.ac.il/{bron/publications/BroBroKimIJCV05.pdf>, 43 P., 2004. Abstract.

Elad et al. "Bending Invariant Representation for Surfaces", Proceedings of the IEEE Conference on Computer Vision and Pattern Recognition, Kauai, Hawaii and Los Alamitos, CA, USA, 1: 168-174, 2001. p. 168, col. 2, § 2, p. 168, col. 1, Section 2 'Fast Marching on Triangulated Domains', p. 169, col. 1, § 1, 2, Section 3 'MDS', p. 171, col. 1, Last §—p. 172, col. 2, § 1, p. 172, col. 2, § 3, p. 173, col. 1, § 1.

Su et al. "An Automatic Construction of A Person's Face Model From the Person's Two Orthogonal Views", Proceedings of the IEEE Geometric Modeling and Processing—Theory and Applications, Piscataway, NJ, USA, p.179-186, 2002. Abstract, p. 180, col.1, § 2, Fig.1.

Zigelman et al. "Texture Mapping Using Surface Flattening Via Multidimensional Scaling", IEEE Transactions on Visualization and Computer Graphics, 8(2): 198-207, 2002. Abstract, p. 201, col. 2, Section 4 'The Flattening Approach'.

Final OA of Feb. 16, 2007.

IPRP CH I of Aug. 30, 2007.

OA Dec. 13, 2007.

OA Jul. 22, 2008 (IPRP).

OA dated May 31, 2007.

OA of Jun. 15, 2006.

OA of May 17, 2005.

SR + WO dated Jun. 30, 2006.

* cited by examiner

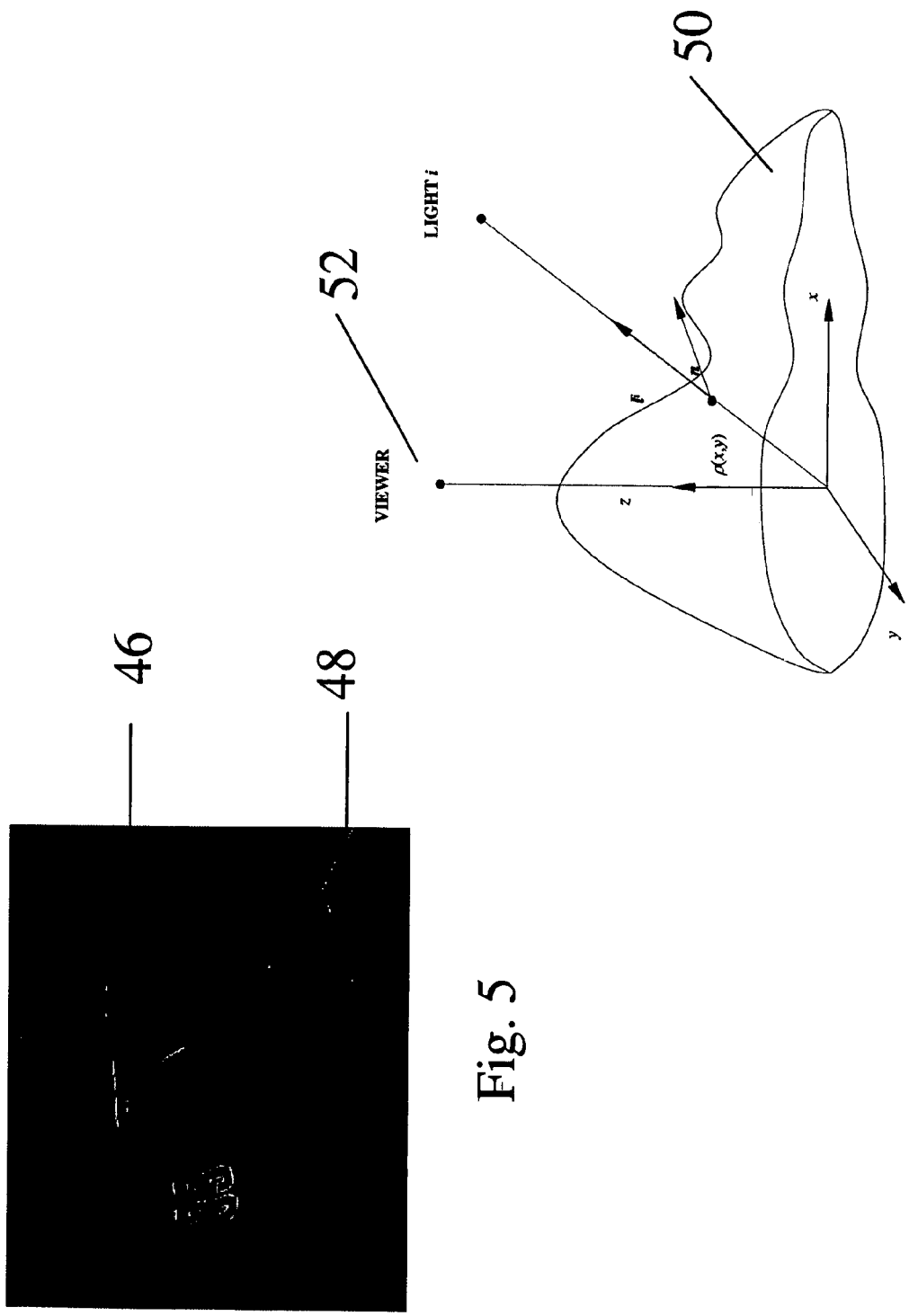

Fig. 23
Fig. 24
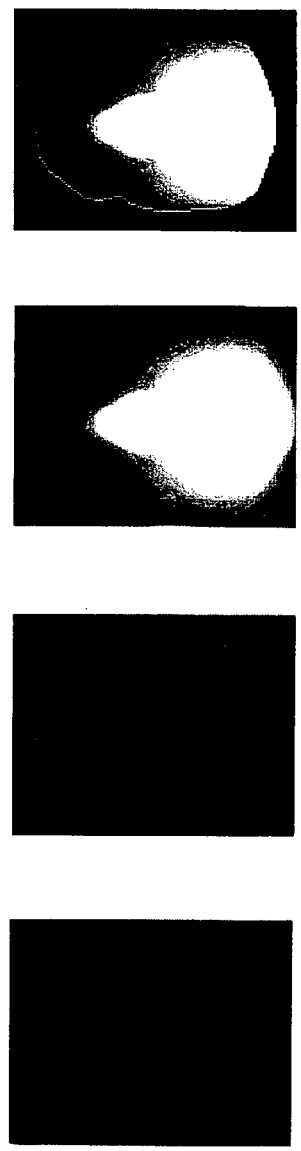
Fig. 25
Fig. 26
Fig. 27
Fig. 28

THREE-DIMENSIONAL FACE RECOGNITION

RELATED APPLICATIONS

The present application is a Continuation of U.S. patent application Ser. No. 10/284,281, filed on Oct. 31, 2002, which claims priority from U.S. Provisional Patent Application No. 60/416,243, filed on Oct. 7, 2002, the contents of both of the above applications are incorporated herein by reference.

FIELD AND BACKGROUND OF THE INVENTION

The present invention relates to a method and apparatus for three-dimensional face recognition and, more particularly, but not exclusively to such a method and apparatus that both obtains a 3D representation of a face and uses that representation for matching purposes.

Face recognition has recently become an important task of computer vision, and is needed in a wide range of biometric and security applications. However, most existing face recognition systems are reported to be sensitive to image acquisition conditions such as head position, illumination, etc. and can therefore be inaccurate and easily fooled. Reference is made to American Civil Liberties Union (ACLU) of Florida, *Press Release,* 14 May 2002, Available: http://www.aclu-fl.org/pbfaceitresults051402.html.

In general, modern face recognition approaches can be divided into two wide categories: 2D approaches, using only image information (which can be either grayscale or color), and 3D approaches, which incorporate three-dimensional information as well.

While simpler in data acquisition (which permits real-time surveillance applications, such as face recognition from a video-taped crowd in pubic places), the 2D approach suffers from sensitivity to illumination conditions and head rotation. Since the image represents the light reflected from the facial surface at a single observation angle, different illumination conditions can result in different images, which are likely to be recognized as different subjects (see FIG. 3). One of the classical 2D face recognition algorithms is the Turk and Pentland eigenfaces algorithm. For a full discussion see M. Turk and A. Pentland, Face recognition using eigenfaces, *CVPR*, May 1991, pp. 586-591, and M. Turk and A. Pentland, "Face recognition system, U.S. Pat. No. 5,164,992, 17 Nov. 1990. The Eigenfaces algorithm works as follows: Given a set of faces arising from some statistical distribution, the principal components of this distribution form a set of features that characterize the variation between faces. "Eigenfaces" are the eigenvectors of the set of "all" faces. The eigenface approach treats face recognition as a 2D classification problem, without taking into consideration the significant difference in the images resulting from illumination conditions and head rotation. For this reason, eigenfaces usually produce mediocre results when faced with real life rather than laboratory conditions.

The 3D approach provides face geometry information, and face geometry information is independent of viewpoint and lighting conditions. Thus such information is complementary to the 2D image. 3D information, however, not only carries the actual facial geometry, but includes depth information which allows easy segmentation of the face from the background.

Gordon showed that combining frontal and profile views can improve the recognition accuracy and reference is made to G. Gordon, "Face recognition from frontal and profile views", *Proc. of the International Workshop on Face and Gesture Recognition,* Zurich, Switzerland, pp. 47-52, June 1995.

Beumier and Acheroy show the adequacy of using geometric information in the rigid face profile for subject identification in a system using structured light for 3D acquisition, and reference is made to C. Beumier and M. P. Acheroy, Automatic Face Identification, *Applications of Digital Image Processing XVIII, SPIE*, vol. 2564, pp. 311-323, July 1995.

The above described approach may be generalized to the whole surface, and reference is made to C. Beumier and M. P. Acheroy, Automatic Face Authentication from 3D Surface, *British Machine Vision Conference BMVC 98*, University of Southampton UK, 14-17 September, 1998, pp 449-458.", 1998, who describe such a generalization using global surface matching. However, surface matching is sensitive to facial expressions and cannot be considered a comprehensive solution.

There is thus a widely recognized need for, and it would be highly advantageous to have, a facial recognition system that uses three-dimensional information but is devoid of the above limitations such as being sensitive to facial expressions, lighting of the subject, or to angle.

SUMMARY OF THE INVENTION

The present invention obtains a canonical form representation of 3-D facial data and uses that canonical representation to compare with other faces. According to one aspect of the present invention there is provided apparatus for processing 3-dimensional data of a geometric body for matching, said apparatus comprising:

a geodesic converter, for receiving 3-dimensional togographical data of said geometric body as a triangulated manifold, and for converting said triangulated manifold into a series of geodesic distances between pairs of points of said manifold, and a multi-dimensional scaler, connected subsequently to said geodesic converter, for forming a low dimensional Euclidean representation of said series of geodesic distances, said low dimensional Euclidean representation providing a bending invariant representation of said geometric body suitable for matching with other geometric shapes.

The apparatus preferably comprises a subsampler located prior to said geodesic converter, configured to subsample said triangulated manifold, and to provide to said geodesic converter a subsampled triangulated manifold.

Preferably, said manifold comprises a plurality of vertices and wherein said subsampler is operable to select a first vertex and to iteratively select a next vertex having a largest geodesic distance from vertices already selected, until a predetermined number of vertices has been selected.

Preferably, said subsampler is operable to use the fast marching method for triangulated domains to calculate geodesic distances between vertices for said iterative selection.

Preferably, said geometric body is a face, having soft geometric regions, being regions of said face susceptible to short term geometric changes, and hard geometric regions, being regions substantially insusceptible to said short term geometric changes, said apparatus comprising a preprocessor, located prior to said subsampler, for removing said soft geometric regions from said face.

Preferably, said preprocessor is operable to identify said soft regions by identification of an orientation point on said face.

Preferably, said orientation point is at least one of a nose tip, a pair of eyeball centers and a mouth center.

Preferably, said preprocessor is further operable to center said face.

Preferably, said preprocessor is further operable to crop said face.

Preferably, said preprocessor is operable to carry out removal of said soft regions by application of a geodesic mask.

Preferably, said geodesic converter is operable to use the fast marching method for triangulated domains to calculate said geodesic distances.

The apparatus preferably comprises a triangulator for forming said triangulated manifold from scan data of a geometric body.

The apparatus may further be operable to embed said triangulated manifold into a space of higher than two dimensions, thereby to include additional information with said topographical information.

Preferably, said additional information is any one of a group comprising texture information, albedo information, grayscale information, and color information.

Preferably, said subsampler comprises an optimizer for allowing a user to select an optimum subsampling level by defining a trade-off between calculation complexity and representation accuracy.

Preferably, said multi-dimensional scalar is configured such that said Euclidean representation comprises a predetermined number of eigenvalues extractable to be used as co-ordinates in a feature space.

Preferably, said predetermined number of eigenvalues is at least three, and said feature space has a number of dimensions corresponding to said predetermined number.

According to a second aspect of the present invention there is provided apparatus for matching between geometric bodies based on 3-dimensional data comprising:

an input for receiving representations of geometric bodies as Euclidean representations of sets of geodesic distances between sampled points of a triangulated manifold, said Euclidean representations being substantially bending invariant representations, a distance calculator for calculating distances between respective geometric bodies based on said Euclidean representation, and a thresholder for thresholding a calculated distance to determine the presence or absence of a match.

Preferably, said distance calculator comprises:

an eigenvalue extractor for extracting a predetermined number of eigenvalues from said Euclidean representations, and a plotter for plotting said predetermined number of eigenvalues as a point on a feature space having a dimension for each of said predetermined number of Eigenvalues, and wherein said thresholder is configured to be sensitive to clustering within said feature space, thereby to determine said presence or absence of said match.

Preferably, said predetermined number is three.

Preferably, said Euclidean representation is based upon geodesic distances between a subsampling of points of said triangulated manifold.

Preferably, said geometric body is a face, having soft geometric regions, being regions susceptible to short term geometric change and hard geometric regions, being regions substantially insusceptible to short term geometric changes, and wherein said Euclidian representation is substantially limited to said hard geometric regions.

Preferably, said distance calculator is configured to use the Hausdorff metric.

According to a third aspect of the present invention there is provided apparatus for obtaining 3-Dimensional data of geometric body for matching, and using said data to carry out matching between different bodies, said apparatus comprising:

a three dimensional scanner for obtaining three-dimensional topographical data of said body, a triangulator for receiving said three-dimensional topographical data of said geometric body and forming said data into a triangulated manifold, a geodesic converter, connected subsequently to said triangulator, for converting said triangulated manifold into a series of geodesic distances between pairs of points of said manifold, a multi-dimensional scaler, connected subsequently to said geodesic converter, for forming a low dimensional Euclidean representation of said series of geodesic distances, said low dimensional Euclidean representation providing a bending invariant representation of said geometric body, a distance calculator, connected subsequently to said multi-dimensional scaler, for calculating distances between geometric bodies based on said Euclidean representation, and a thresholder, connected subsequently to said distance calculator, for thresholding a calculated distance to determine the presence or absence of a match.

Preferably, said distance calculator comprises:

an eigenvalue extractor for extracting a predetermined number of eigenvalues from said Euclidean representations, and a plotter for plotting said predetermined number of Eigenvalues as a point on a feature space having a dimension for each of said predetermined number of eigenvalues, and wherein said thresholder is configured to be sensitive to clustering within said feature space, thereby to determine said presence or absence of said match.

Preferably, said predetermined number is three.

Alternatively, said predetermined number is greater than three.

The apparatus preferably comprises a subsampler located between said triangulator and said geodesic converter, configured to subsample said triangulated manifold, and to provide to said geodesic converter a subsampled triangulated manifold.

Preferably, said subsampler is operable to use geodesic distances in selecting points from said triangulated manifold to include in said subsampled triangulated manifold.

Preferably, said subsampler is configured to take an initial point and then iteratively to select points by taking points furthest away in terms of a geodesic distance from already selected points.

Preferably, said geometric body is a face, having soft geometric regions and hard geometric regions, said apparatus comprising a preprocessor, located between said triangulator and said subsampler, for removing said soft geometric regions from said face.

Preferably, said geometric body is a face, having soft geometric regions and hard geometric regions, said apparatus comprising a preprocessor, located between said triangulator and said geodesic converter, for removing said soft geometric regions from said face.

Preferably, said preprocessor is operable to identify said soft regions by identification of an orientation point on said face.

Preferably, said orientation point is a nose tip.

Preferably, said preprocessor is further operable to center said face.

Preferably, said preprocessor is further operable to crop said face.

Preferably, said preprocessor is operable to carry out removal of said soft regions by application of a geodesic mask.

Preferably, said geodesic converter is operable to use the fast marching method for triangulated domains to calculate said geodesic distances.

Preferably, said subsampler comprises an optimizer for allowing a user to select an optimum subsampling level by defining a trade-off between calculation complexity and representation accuracy.

Preferably, said distance calculator is configured to use the Hausdorff metric.

According to a fourth aspect of the present invention there is provided a method of image preprocessing of three-dimensional topographical data for subsequent classification, the method comprising:

providing said three-dimensional topographical data as a three-dimensional triangulated manifold, generating a matrix of geodesic distances to selected vertices of said manifold, using multi-dimensional scaling to reduce said matrix to a canonical representation in a low-dimensional Euclidean space, thereby to provide a representation suitable for subsequent classification.

The method may further comprise selecting said vertices for generating said matrix of geodesic distances by a procedure comprising iteratively selecting a next vertex having a largest geodesic distance from vertices already selected, until a predetermined number of vertices has been selected.

The method may further comprise determining geodesic distances for said procedure using the fast marching method for triangulated domains.

Preferably, said three-dimensional topographical data is a representation of a face, and further comprising cropping said face to exclude parts of said face being susceptible to short term changes, thereby to render said subsequent classification substantially invariant to said short term changes.

According to a fifth aspect of the present invention there is provided a method of classifying images of three-dimensional bodies comprising:

obtaining representations of said three dimensional bodies as canonical form representations derived from geodesic distances between selected sample points taken from surfaces of said bodies, from each representation deriving co-ordinates on a feature space, and classifying said bodies according to clustering on said feature space.

Preferably, said deriving co-ordinates comprises deriving first m eigenvalues from respective canonical form representations, where n is a predetermined number, and using said m eigenvalues to provide said co-ordinates, said feature space being constructed to have n dimensions.

Preferably, n is at least three.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing selected tasks or steps manually, automatically, or as a combination thereof. Moreover, according to actual instrumentation and equipment of preferred embodiments of the method and system of the present invention, one or more steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 5 is a photograph showing a 3D scanner arrangement comprising a video camera and a moving laser projector;

FIG. 6 is a simplified schematic diagram illustrating a photometric stereo acquisition scheme;

FIG. 23 is a set of three faces from a further database, the faces used as subjects for the fourth experiment;

FIG. 24 is a set of three poses of a face of FIG. 23, also for use in the fourth experiment;

FIG. 25 shows a texture map of a face before application of a mask as part of preprocessing;

FIG. 26 shows the texture map of FIG. 25 after application of a geodesic mask;

FIG. 27 shows a depth map of a face before application of a mask as a part of preprocessing;

FIG. 28 shows the depth map of FIG. 27 after application of a geodesic mask;

DESCRIPTION OF THE PREFERRED EMBODIMENTS

Figure 1:
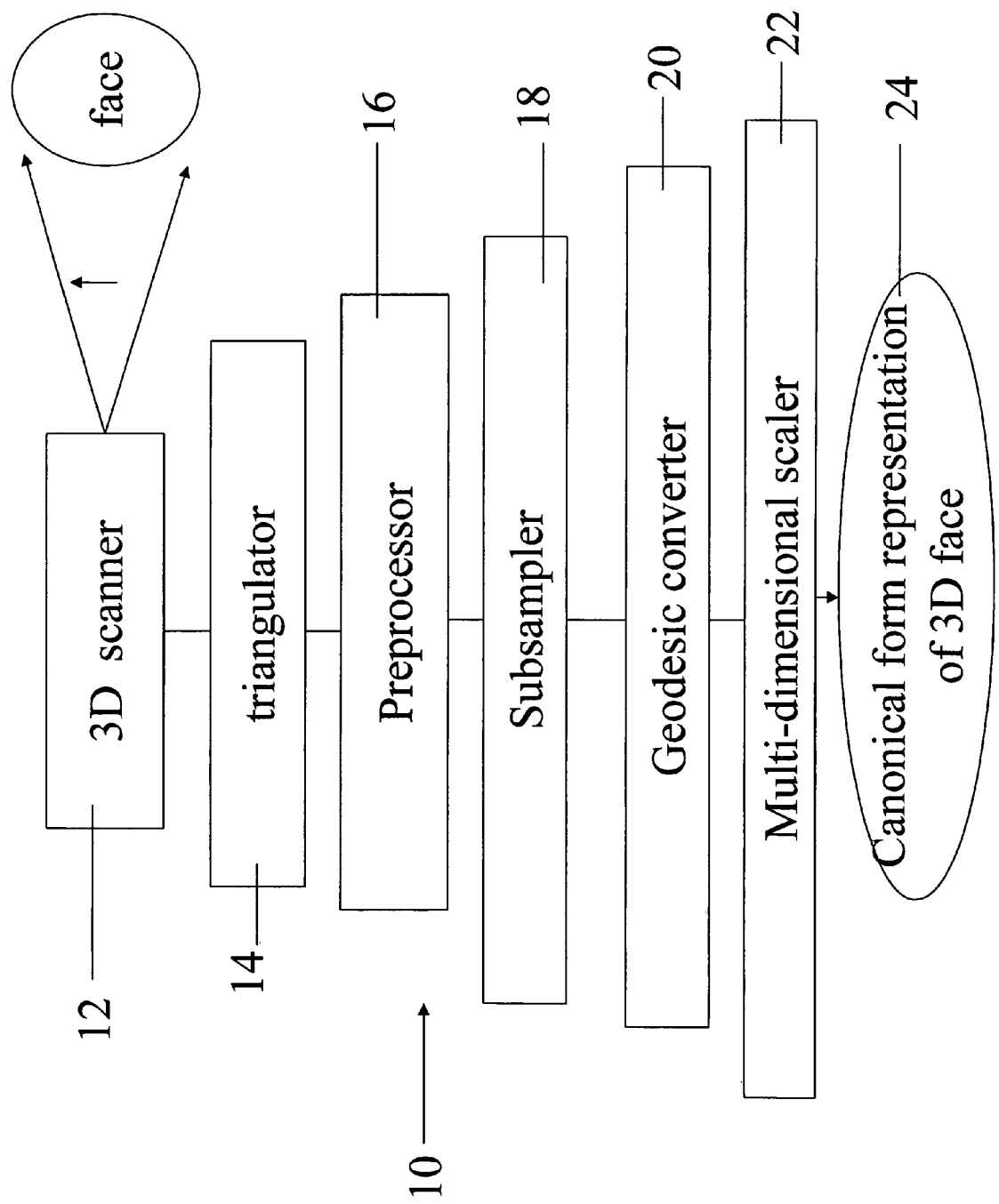
FIG. 1 is a simplified block diagram showing a preferred embodiment of a device for gathering 3D topographical data of a body and processing the data into a canonical form representation for efficient matching, according to a first preferred embodiment of the present invention.

The present embodiments show a face recognition approach based on 3D geometric or topographical information. Given a 3D facial surface, a geometric bending-invariant canonical form can be obtained by sampling the surface, computing the geodesic distances between points on it (using the Fast Marching method) and applying Multidimensional scaling (MDS). MDS allows representation of the surface in a low-dimensional Euclidean space, the bending invariant canonical form, and the canonical form is a representation which can be used for classification in general and matching in particular.

Facial recognition using 3D geometry may be used on its own or to augment conventional 2D imaging. As the 3D geometry is independent of viewpoint and lighting conditions, accurate face classification can be achieved.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIG. 1 is a simplified diagram showing apparatus for obtaining 3-Dimensional data of a geometric body for classification, including matching, according to a first preferred embodiment of the present invention. The preferred embodiments relate specifically to matching of faces but the skilled person will be aware that the principles of the present invention are applicable to any geometric body having a three-dimensional structure.

Apparatus 10 comprises a three dimensional scanner 12 for obtaining three-dimensional topographical data of the body. Several types of scanner are described hereinbelow together with brief discussions of how to process data therefrom in some of the cases.

Data from the three-dimensional scanner 12 is passed to a triangulator 14. The triangulator may perform triangulation on the data received from the scanner in order to generate a three-dimensional triangulated manifold to represent the topological features of the body. The exact operation of the triangulator to derive the manifold may vary depending on the way in which the 3D information is gathered. In certain cases the manifold may be formed directly from the gathered data without the need for any intervening processing stage. The manifold preferably represents all of the three-dimensional topology of the body and therefore is in theory sufficient for allowing matching. However, in practice, direct comparisons using the triangulated manifold have a number of disadvantages, as will be demonstrated in experiment 3 hereinbelow. They requires a large amount of calculation. Matching does not distinguish reliably between different faces. Moreover matching generally fails when the same face has a different expression and matching is unreliable even when the same face is posed at a different angle.

Embodiments of the present invention therefore preferably include four additional processing stages, the first of which is a preprocessor 16. Preprocessor 16 takes a reference point in order to determine an orientation around the manifold. A reference point which is relatively easy to find automatically from a manifold of a face is the tip of the nose. Other possible reference points include centers of eyeballs and the center of the mouth. Once the preprocessor has found the tip of the nose it is able to orientate itself with respect to the rest of the face and then parts of the face whose geometry is particulary susceptible to expressions, hereinafter referred to as soft regions, can be ignored. Parts of the face that are invariant with change of expression and the like, hereinafter hard regions, can be retained or even emphasized. As will be explained in greater detail below, the definition of soft regions is not fixed. For some methods and in some circumstances soft regions to be excluded may include all of the lower region of the face around the mouth. In other cases less drastic exclusions may be considered. In one embodiment, described in greater detail below, soft regions are removed using a geodesic mask. The mask may be applied separately to a texture map of the face and a depth map of the face.

Following the preprocessor is a subsampler 18. The subsampler 18 takes the preprocessed manifold and removes points so as to produce a less well defined manifold, but one which still defines the essential geometry of the face it is desired to match. In preferred embodiments, the user is able to select the number of points to trade off between accurate matching—a large number of points—and faster processing—a smaller number of points. As will be discussed in greater detail below, a preferred embodiment of the subsampler uses the Voronoi subsampling technique which begins at an initial point or vertex on the manifold and then adds the point or vertex having the greatest distance therefrom. The procedure is repeated iteratively until the selected number of points are included. Preferably the technique uses geodesic distances, which may be obtained using the fast marching method for the triangulated domain (FMM-TD), as described below.

Following the subsampler is a geodesic converter 20. The geodesic converter 20 receives the list of points of the subsampled manifold and calculates a vector for each pair of points. The vectors are expressed as geodesic distances, and the fast marching algorithm for the triangulated domain is again used to obtain the geodesic distances in an efficient manner as possible.

Following the geodesic converter is a multi-dimensional scaler 22, which takes the matrix of the geodesic distances calculated by the geodesic converter 20, referred to below as the distance matrix, and forms a low dimensional Euclidean representation of the series of geodesic distances, using multi-dimensional scaling. Multi-dimensional scaling is discussed in detail below. The low dimensional Euclidean representation provides a bending invariant representation of the geometric body, as will be explained in the discussion on multi-dimensional scaling below. The use of such a bending invariant representation ensures that the matching process is not fooled by, for example, scans of the head at different angles.

The output 24 of the multi-dimensional scalar is a representation of the 3D face in terms of Euclidean distances between surface points, referred to hereinbelow as the canonical form representation.

Figure 2:
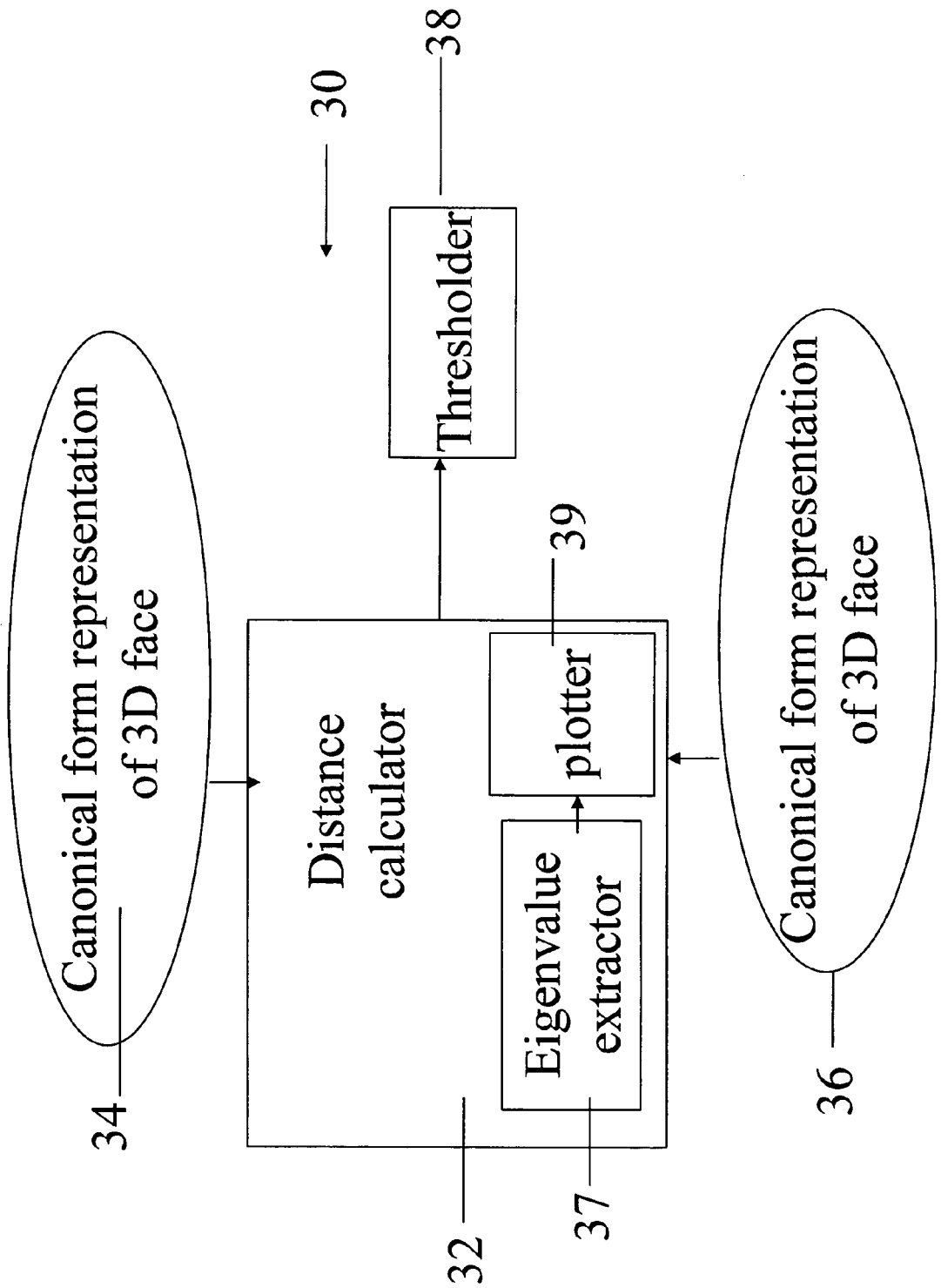
FIG. 2 is a simplified diagram of apparatus for receiving 3D topographical data in canonical form representation and for carrying out matching or classification, according to a second preferred embodiment of the present invention.

Reference is now made to FIG. 2, which is a simplified diagram showing a matching apparatus for matching two faces using the canonical form output as described above. The matcher 30 may be a continuation of the apparatus 10 or may be supplied as a separate unit. The matcher 30 comprises a distance calculator 32, which takes as input two canonical form representations 34 and 36, and calculates a distance therebetween. The distance calculation may use any suitable method for comparison of the canonical forms for each of the faces to be matched. A straightforward approach is to measure a distance between two sets of points, using, for example, the Hausdorff metric. However, the Hausdorf metric based method is computationally extensive.

An alternative approach, used in the present embodiments, takes the first m eigenvalues obtained from the MDS procedure to provide coordinates in a low-dimensional feature space. Although the dominant eigenvalues do not describe the canonical form entirely, it is reasonable that similar faces have similar eigenvalues (and thus form clusters in the feature space). A distance is calculated between the geometric bodies, or, as will be described below, plotted on a graph of the feature space and a thresholder 38, which is connected subsequently to the distance calculator, thresholds the calculated distance to determine the presence or absence of a cluster in the feature space, the cluster indicating a match. In the embodiments described in detail herein, the first three Eigenvalues are taken and are plotted in a three dimensional feature space.

Figure 3:
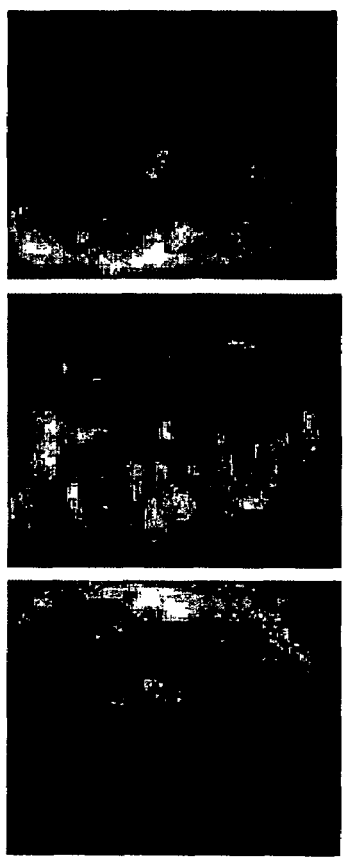
FIG. 3 is a series of 2D representations of a single face, each taken under different lighting conditions. The faces are clearly the same to the human observer but are very difficult to match using conventional image analysis techniques.

Reference is now made to FIG. 3, which shows a series of three two-dimensional images. It will be apparent to any human observer that the three images are of the same face, however conventional automatic matching techniques generally find very large distances between the three images and consequently fail to match them. Thus two-dimensional facial matching is prone to errors introduced by simple variables such as lighting direction. In fact, areas of the face that have high reflectivity, such as the eyes, can change substantially for very minor changes in lighting.

Returning now to FIG. 1, and as mentioned above, apparatus 10 preferably comprises a three-dimensional scanner 12. The face recognition described in the present embodiments treats faces as three-dimensional surfaces. It is therefore first of all necessary to obtain the facial surface of the subject that it is desired to recognize. Below is a short overview of currently available range finding techniques that are able to scan a face and generate three-dimensional data.

Laser Range Camera (Zcam)

Figures 4A, 4B:
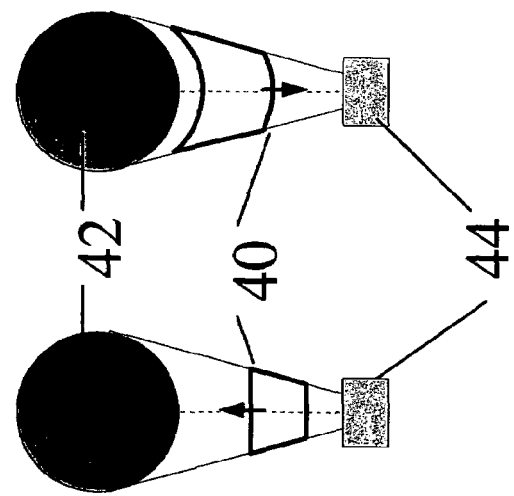
FIG. 4a is a simplified schematic diagram showing a first stage of 3D data gathering using depth code illumination.
FIG. 4b is a simplified schematic diagram showing a second stage of 3D data gathering using depth code illumination.

Reference is now made to FIGS. 4a and 4b, which are simplified diagrams showing successive stages of operation of a laser range camera using depth encoding illumination. Currently, the fastest and most accurate, but at the same time most expensive, range cameras are those that are based on depth-encoding illumination.

Depth-encoded illumination is based upon the generation of a wall of light 40 which moves along the field of view. As the light hits the objects 42 in the scene, it is reflected back towards the camera 44. Due to the finite speed of the light, the reflection carries an imprint of the object depth which may be decoded using the appropriate electronics. The illumination is typically generated using IR laser diodes.

A 3D acquisition equipment of this type is known from WO Patent 01/18563, Mar. 15, 2001, the contents of which are hereby incorporated by reference. Such a technology allows real-time data acquisition at about 30 fps frame rate. Depth resolution can be greatly improved by averaging frames in time. Typical prices range between US$2K-50K.

3D Scanner

A slower and cheaper version of a 3D scanner is based upon J.-Y. Bouguet and P. Perona, "3D photography on your desk", in Proc. of the Int. Conf. on Computer Vision, Bombay, India, January 1998. The scanner is based on a lamp and a pencil casting a line of shadow on a desk, and an implementation by Zigelman and Kimmel uses a narrow laser beam instead of shadow, see G. Zigelman and R. Kimmel, "Fast 3D laser scanner", Dept. of Computer Science, Technion—Israel Institute of Technology, Tech. Rep. CIS-2000-07, 2000. A typical device is shown in FIG. 5 and comprises a video camera 46 and moving laser projector 48. Using the device of FIG. 5, depth reconstruction is performed by analyzing the laser beam deformation as it illuminates the object. A related approach is discussed below under the heading "structured light".

Such a scanner can be constructed from cheap materials having a cost of between US$ 50-200. Typical scan speeds for faces achievable with such devices are within the range 15-30 sec, and the low scan speed limits the approach to laboratory and like controlled conditions.

Structured Light

The idea of structured light relates to the projecting of a known pattern (e.g. parallel stripes) on to an object, and subsequently capturing depth information from the pattern deformation. Further details are available from C. Rocchini, P. Cignoni, C. Montani, P. Pingi and R. Scopigno, A low cost 3D scanner based on structured light, *EUROGRAPHICS 2001*, A. Chalmers and T.-M. Rhyne (Guest Editors), Volume 20 (2001), Number 3, the contents of which are hereby incorporated by reference.

Typical data acquisition setup includes a CCD camera and a projector and is relatively inexpensive with current costs being in the region of US$1K -5K. Such a data acquisition device was used by Beumier and Acheroy for 3D face recognition, and reference is made to C. Beumier and M. P. Acheroy, Automatic Face Identification, *Applications of Digital Image Processing XVIII, SPIE*, vol. 2564, pp. 311-323, July 1995, and to C. Beumier and M. P. Acheroy, Automatic Face Authentication from 3D Surface, *British Machine Vision Conference BMVC* 98, University of Southampton UK, 14-17 September, 1998, pp 449-458, 1998, the contents of which are hereby incorporated by reference.

The disadvantage of the structured light method is the need for controlled illumination conditions, again rendering the method inapplicable to many real life applications.

Photometric Stereo

An alternative way of facial surface acquisition, which does not require any dedicated hardware, is surface reconstruction from photometric stereo. Photometric stereo requires the acquiring of several images of the same subject in different illumination conditions and extracting the 3D geometry from the images by assuming a Lambertian reflection model. A surface is said to exhibit Lambertian reflection if it behaves as a dull or matte surface. That is to say, for incident light from any direction, the reflection is entirely diffuse, meaning that light is reflected in equal intensity in all directions. For any given surface, the brightness depends only on the angle between the illumination source and the surface normal.

Reference is now made to FIG. 6, which is a simplified diagram showing a facial surface 50, represented as a function, viewed from a given position 52 on the z-axis. The object is illuminated by a source of parallel rays 54 directed along $l^i$.

In the following, Lambertian reflection is assumed and the observed picture is thus given by $$I^i(x,y) = \rho(x,y) \langle n(x,y), l^i \rangle, \quad (1)$$

where $\rho(x,y)$ is the object albedo or reflective power, and $n(x,y)$ is the normal to the object surface, expressed as $$n(x, y) = \frac{[-z_x(x, y), -z_y(x, y), 1]}{\sqrt{1 + \|\nabla z(x, y)\|_2^2}}. \quad (2)$$

Using matrix-vector notation, equation (1) can be rewritten as $$I(x,y) = Lv \quad (3)$$

where $$L = -\begin{bmatrix} l_1^1 & l_2^1 & l_3^1 \\ \vdots & \vdots & \vdots \\ l_1^N & l_2^N & l_3^N \end{bmatrix}; I(x, y) = \begin{bmatrix} I^1(x, y) \\ \vdots \\ I^N(x, y) \end{bmatrix} \quad (4)$$

and $$v_1 = z_x v_3; \, v_2 = z_y v_3; \, v_3 = \frac{\rho(x, y)}{\sqrt{1 + \|\nabla z\|_2^2}}. \quad (5)$$

Given at least 3 linearly independent illuminations $\{l^i\}_{i=1}^N$, and the corresponding observations $\{I^i\}_{i=1}^N$, one can reconstruct the values of $\nabla z$ by pointwise least-squares solution $$v = L^+ I(x,y) \quad (6)$$

where $L^+ = (L^T L)^{-1} L^T$ denotes the Moore-Penrose pseudo-inverse. It is noted that the Moore-Penrose pseudoinverse is a substitute for the inverse matrix, and is useful in circumstances in which a standard inverse matrix does not exist. A function for obtaining the Moore-Penrose pseudoinverse of a matrix is provided for example as a standard feature in Matlab.

Having the gradient $\nabla z$, the surface 50 can be reconstructed by minimization of the following function:

$$\tilde{z} = \underset{\tilde{z}}{\operatorname{argmin}} \int \int [(\tilde{z}_x - z_x)^2 + (\tilde{z}_y - z_y)^2] dx dy \quad (7)$$

The Euler-Lagrange conditions of equation (7), in turn, allow rewriting of the Poisson equation thus, $$\tilde{z}_{xx} + \tilde{z}_{yy} = z_{xx} + z_{yy} \quad (8)$$

[1] the solution of which yields a reconstructed surface $\tilde{z}$. See R. Kimmel, *Numerical geometry of images*, Lecture notes.

One of the obvious problems in the surface reconstruction from photometric stereo approach arises from deviations from the Lambertian model in real faces. In face recognition applications, some face features (such as eyes, hair, beard etc.) have a strongly non-Lambertian nature.

To reduce the irregularities in the reconstructed surface, one can add a penalty term on surface non-smoothness to the least-squares solution, for example to give a total variation:

$$\tilde{z} = \underset{\tilde{z}}{\operatorname{argmin}} \int \int [(\tilde{z}_x - z_x)^2 + (\tilde{z}_y - z_y)^2] dx dy + \quad (8a)$$

$$\lambda \int \int \|\nabla z\|_2 dx dy$$

Geometric Face Recognition Scheme

The face recognition scheme of the present embodiments is based on the geometric features of the three-dimensional facial surface. The geometric features may be obtained either directly from a 3D scan and incorporated as points or vertices into a triangulated manifold of the kind shown in FIG. 7, or the vertices may be derived from photometric stereo and then arranged to form the triangulated manifold.

Preliminary processing, such as centering and cropping, is preferably performed on the manifold prior to recognition. Centering and cropping actions can be carried out by simple pattern matching, which may use the eyes, or the tip of the nose 60, as the most recognizable feature of the human face. The facial contour may also be extracted in order to limit processing to the surface belonging to the face itself, thus to exclude foreground items such as spectacles and the like. Such tasks are preferably performed by the preprocessor 16 referred to above.

Preprocessing preferably emphasizes those sections of the face less susceptible to alteration, the so-called hard regions, including the upper outlines of the eye sockets, the areas surrounding one's cheekbones, and the sides of the mouth. On the other hand, sections, which can be easily changed (e.g. hair), the soft regions, are preferably excluded from the recognition process. As will be discussed below, regions that change significantly according to expression can also be included as soft regions and excluded, and in certain embodiments processing may be limited just to the upper part of the face.

Figure 8:
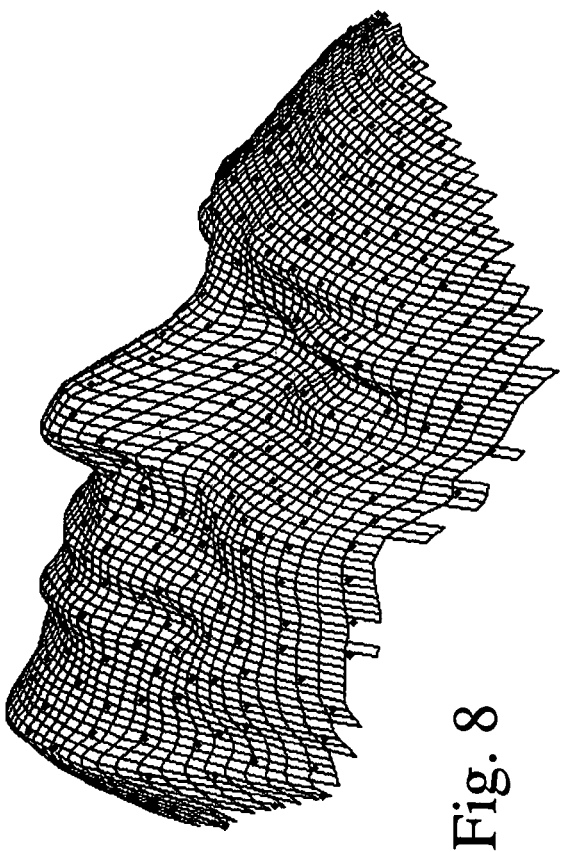
FIG. 8 is a simplified diagram showing the manifold of FIG. 7 after subsampling.

Following treatment by the preprocessor, the manifold typically still comprises too many points for efficient processing and more points than are really necessary to convey the underlying facial geometry. Hence subsampling is carried out using subsampler 18 in order to form the subsampled manifold of FIG. 8.

Figure 9:
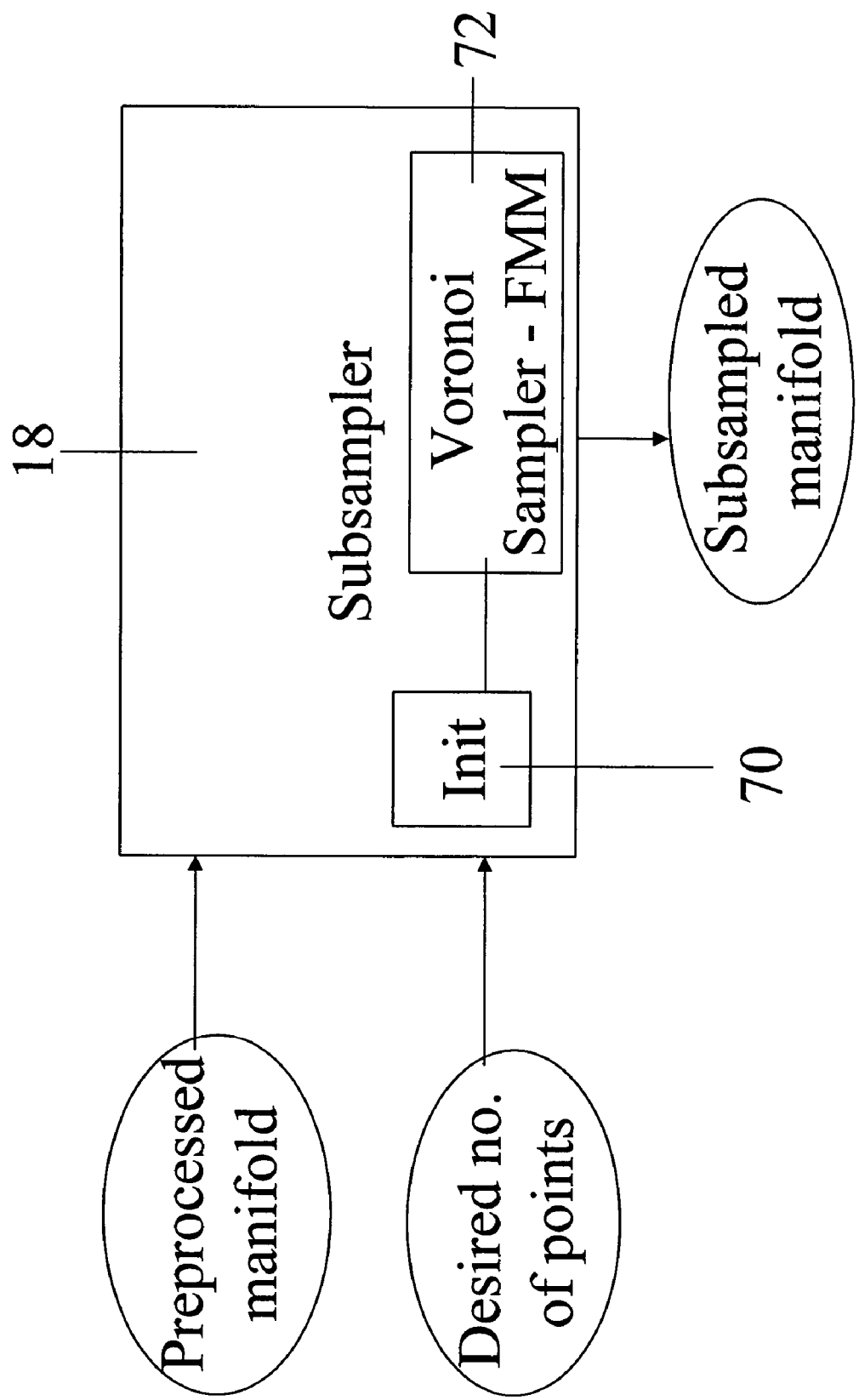
FIG. 9 is a simplified block diagram showing in greater detail the subsampler of FIG. 1.

Reference is now made to FIG. 9, which is a simplified block diagram showing the subsampler 18 in greater detail. The subsampler comprises an initializer 70, and a Voronoi sampler 72, and takes as inputs the preprocessed full manifold and a desired number of points, or any other user-friendly way of defining a trade-off between accuracy and computational efficiency.

In the subsampling procedure, a subset of n uniformly distributed vertices is selected from the triangulated surface within the facial contour. The sub-sampling is performed using the iterative Voronoi sampling procedure, where on each iteration a vertex with the largest geodesic distance from the already selected ones is selected. The procedure is initialized by a constant vertex selected by the initializer and the geodesic distances needed are preferably computed using FMM-TD, the mathematics of which are discussed in greater detail below. For further information on Voronoi sampling, reference is made to CISM Journal ACSGC Vol. 45 No. 1. Spring 1991 pp 65-80, Problems with handling spatial data, the Voronoi approach, Christopher M. Gold. FMM-TD is discussed in greater detail below.

Figure 10:
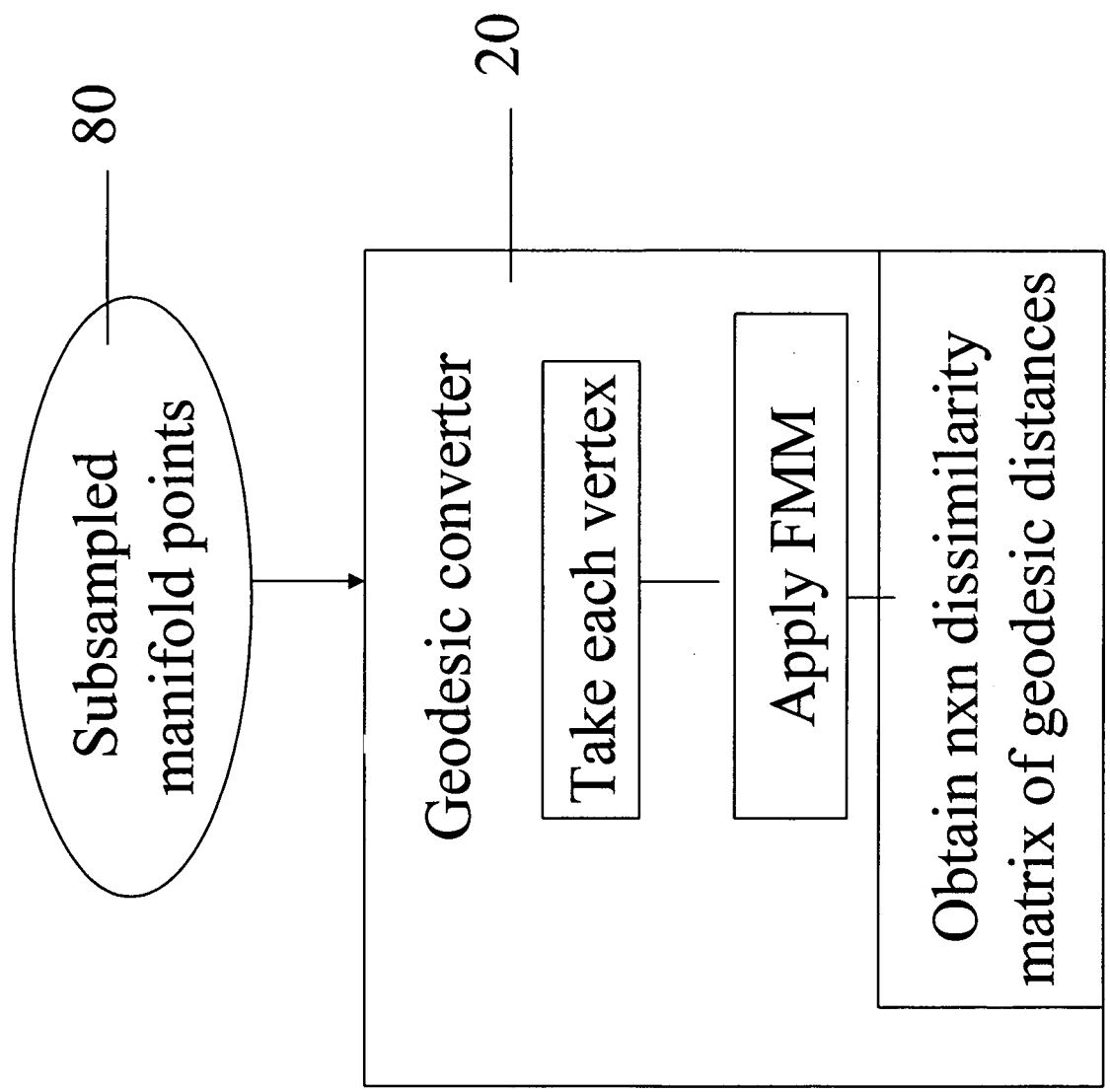
FIG. 10 is a simplified block diagram showing in greater detail the geodesic converter of FIG. 1.

Reference is now made to FIG. 10, which is a simplified block diagram showing in greater detail the geodesic converter 20 of FIG. 1. In the geodesic converter 20, sets of points 80 are received from the subsampler 18. An n×n distance matrix of geodesic distances is then created by applying FMM-TD from each of the n selected vertices to each other vertex. One of the principles ensuring the low computational complexity of FMM-TD is the fact that already calculated distances from the Voronoi sampling can be reused in subsequent computations such as computing the geodesic distance matrix.

Using the n×n distance matrix, multi-dimensional scaling (MDS) is applied to produce a dissimilarity matrix, a map of similarities or dissimilarities that provides a canonical representation of the face in a low-dimensional Euclidean space. Since isometric transformations do not affect the geodesic distances, it may be expected that a face undergoing such a transformation yields the same canonical form as that of the original face. Studies carried out by the inventors show that indeed slight non-isometric transformations produce small but insignificant deviations from the original canonical form. MDS is discussed in greater detail below.

The last stage of the facial matching operation consists of matching or classification, i.e. comparison of the canonical forms. A straightforward approach is to measure a distance between two sets of points, using, for example, the Hausdorff metric. However, the Hausdorf metric based method is computationally extensive and should be therefore avoided.

An alternative approach, used in the present embodiments, takes the first m eigenvalues obtained from the MDS procedure to provide coordinates in a low-dimensional feature space. Although the dominant eigenvalues do not describe the canonical form entirely, it is reasonable that similar faces have similar eigenvalues (and thus form clusters in the feature space). Experiments, cited below, show that the described comparison is sufficiently accurate and has low computational complexity. In the present embodiments the first three eigenvalues are taken and plotted onto a three-dimensional feature space.

Fast Marching on Triangulated Manifolds

Face recognition according to the present embodiments uses geodesic distances between points on the facial surface, both for subsampling and for creating a distance matrix from the subsampled points. Initially, one computes distances between pairs of points on a triangulated manifold representing the facial surface, and then an efficient numerical method is required to obtain geodesic distances therefrom.

A method known as The Fast Marching Method (FMM), is disclosed by J. A. Sethian, A fast marching level set method for monotonically advancing fronts, Proc. Nat. Acad. Sci., 93, 4, 1996, the contents of which are hereby incorporated by reference. The fast marching method was subsequently extended to triangulated domains (FMM-TD) as disclosed in R. Kimmel and J. A. Sethian, Computing geodesic paths on manifolds, the contents of which are likewise incorporated by reference. FMM-TD is an efficient numerical method to compute a first-order approximation of the geodesic distances.

Figure 7:
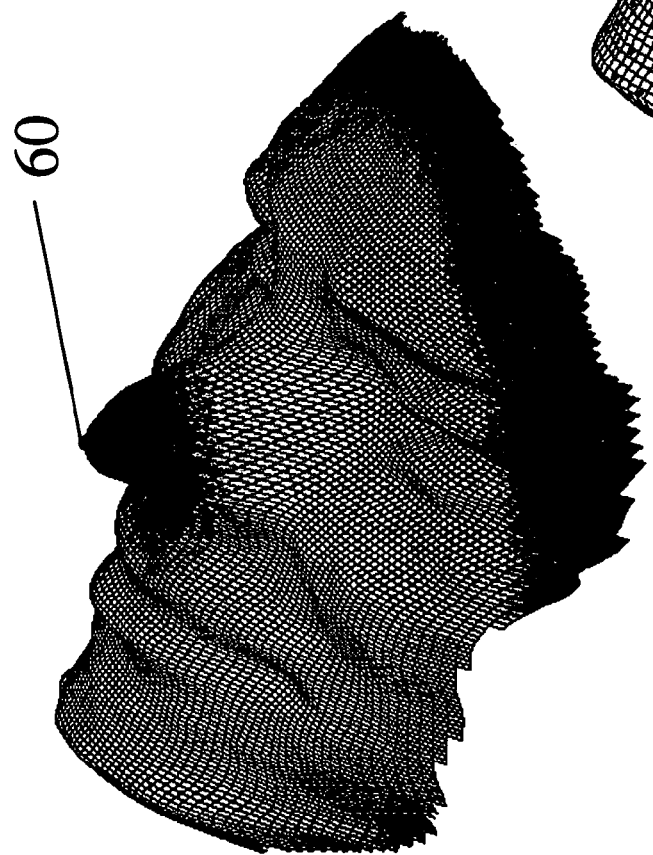
FIG. 7 is a triangulated manifold representation using data points gathered by 3D scanning of a face.

Given a set of source points $\{s_i\}$ on a manifold such as that of FIG. 7, the distance map $T(x,y)$ from these points to other points on the manifold is obtained as the solution of the Eikonal equation $$\|\nabla T\|=1;\ T(s_i)=0 \quad (9)$$

FMM-TD allows computing of the distance map with O(N log N) complexity, where N is the number of points on the manifold.

When the face geometry is obtained from photometric stereo additional efficiency can be achieved as follows. There is no actual need to compute the surface itself from equation (8) above. It is sufficient to find the gradient $\nabla z$, and use its values to construct the metric used by the FMM.

Multidimensional Scaling

Multidimensional scaling (MDS) is a method that maps measured similarities or dissimilarities among a set of objects into a representation of the pattern of proximities in a low-dimensional Euclidean space, and in this context, reference is made to G. Zigelman, R. Kimmel, and N. Kiryati, Texture mapping using surface flattening via multi-dimensional scaling, Accepted to *IEEE Trans. on Visualization and Computer Graphics*, 2001, and R. Grossmann, N. Kiryati, and R. Kimmel. Computational surface flattening: A voxel-based approach. Accepted to *IEEE Trans. on PAMI*, 2001, the contents of both of these documents hereby being incorporated herein by reference.

Given a set of n objects, their mutual similarities $\{d_{i,j}\}_{i,j=1}^{n}$ and the desired dimensionality m, MDS finds a set of vectors in m-dimensional space (each vector corresponding to an object) such that the matrix of Euclidean distances among them corresponds as closely as possible to a function of the input matrix D according to a certain criterion function.

In the present embodiments, proximity values are obtained by measuring the geodesic distances between points on the facial surface using the FMM-TD method. A. Elad and R. Kimmel, Bending invariant representations for surfaces, Proc. of CVPR'01 Hawaii, December 2001, the contents of which are hereby incorporated herein by reference, showed that applying MDS to geodesic distances on a manifold produces a bending-invariant canonical form.

There exists a variety of different algorithms for solving the MDS problem; in each of them a tradeoff between computational complexity and algorithm accuracy is made. The present embodiments make use of the classical scaling algorithm introduced by Young et al. however the skilled person will appreciate the applicability of other methods.

Classical scaling finds the coordinates $x_i$ of n points in a k-dimensional Euclidean space, given their mutual distances $\{d_{i,j}\}_{i,j=1}^n$. The Euclidean distance between the points i and j is expressed by $$d_{ij}^2 = \|x_i - x_j\|_2^2 = (x_i - x_j)^T (x_i - x_j). \quad (10)$$

Given the squared-distance matrix D with elements as in (10) one can construct the inner-product matrix $$B = -\frac{1}{2}(I - 1/n 11^T) D (I - 1/n 11^T) = XX^T \quad (11)$$

where $1 = [1, \ldots, 1]^T$ and $X = [x_1, \ldots, x_n]^T$. B is a positive semi-definite matrix with at most k positive eigenvalues, which can be expressed as $$B = U\Lambda U^T. \quad (12)$$

The coordinate matrix X is therefore obtained by computing the square root matrix of B $$X = U\Lambda^{1/2}. \quad (13)$$

It is noted that, from a statistical point of view, the above-described approach is equivalent to principal component analysis (PCA), which finds an orthogonal basis that maximizes the variance of the given n vectors projected to the basis vectors.

Empirical observations show that three dimensions usually suffice for representation of most of the geometric structure contained in the geodesic distances measured on a smooth surface.

Figure 11:
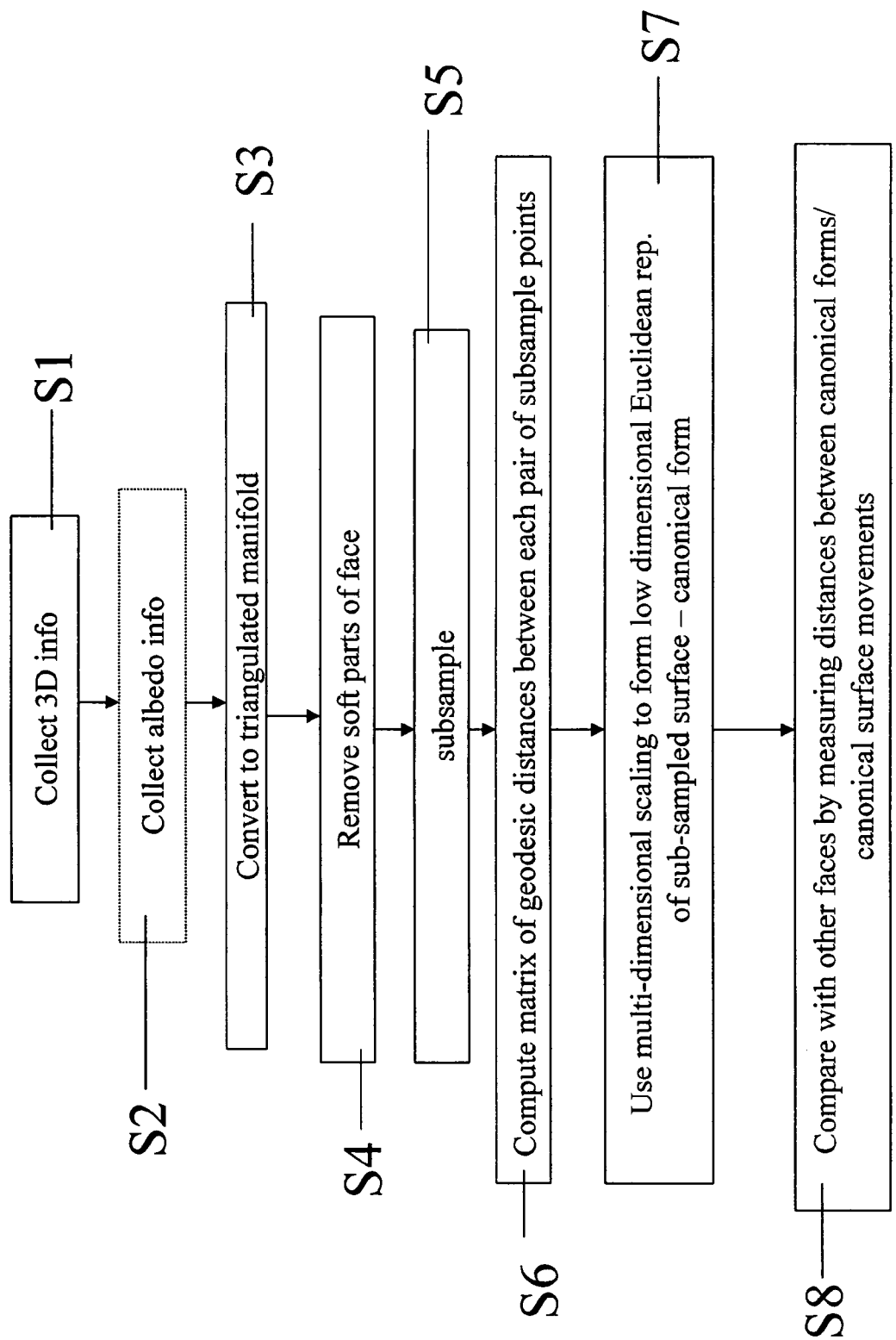
FIG. 11 is a simplified flow chart showing operation of a preferred embodiment of the present invention.

Reference is now made to FIG. 11, which is a simplified flow chart showing the process flow of embodiments of the present invention, and showing how the various procedures and functions described above may work together. In a first stage S1, 3D data is collated from the object it is desired to match. Collation may use any of the scanning methods described above or any other suitable method of gathering 3D topological information of a body. In an optional stage S2, albedo or reflectivity power information may be gathered. One of the possibilities of incorporating albedo information is by embedding the two-dimensional face manifold into a 4D or 6D space and measuring distances on the manifold using a combined metric, thus the $4^{th}$ coordinate in the 4D-embedding and the $4^{th}$-$6^{th}$ coordinates in the 6D-embedding represent the gray level or the RGB channels of the albedo information, respectively.

The data gathered is then presented in a stage S3 as a series of points on a triangulated manifold such as that of FIG. 6. The manifold may be constructed directly from the 3D data or may require auxiliary calculations, depending on the data gathering method used.

Stage S4 is a preprocessing stage. The preprocessing stage removes soft—that is often changing regions of the face geometry and retains hard regions, that is those regions that remain constant. Preprocessing may also include cropping the image and like operations. Preprocessing preferably involves locating a reference point on the face and then using the general facial form to determine the locations of the soft regions that are to be ignored.

Figure 12:
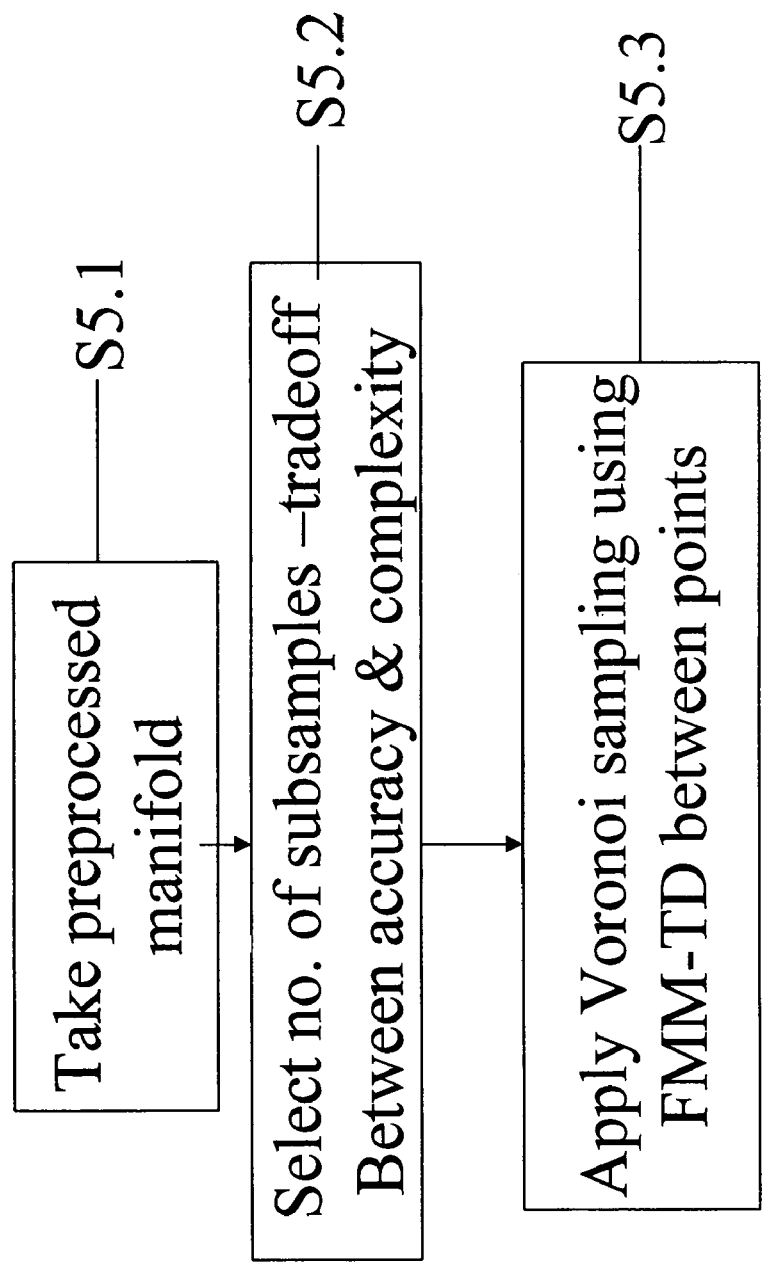
FIG. 12 is a simplified flow chart showing in greater detail the subsampling stage of FIG. 11.

Stage S5 is a subsampling stage. The preprocessed manifold is reduced by selecting only those points which are most crucial for retaining geometric information. As discussed above, efficient techniques such as Voronoi sampling may be used. Stage S5 is shown in greater detail in FIG. 12 in which a stage S5.1 comprises input of the preprocessed manifold. A selection stage S5.2 allows a user to set a desired number of points for the subsampling in a tradeoff between accuracy and computational complexity. Finally a stage 5.3 involves Voronoi sampling, which looks for the minimum number of points having the maximum topological information. As discussed above, an initial point is taken and then a farthest point therefrom is added until the desired number of points is reached. Geodesic distances are used to determine furthest points and FMM-TD can be used to find the geodesic distances.

In a stage S6, a distance matrix is computed of geodesic distances between each subsampled vertex and each other point. As explained above, FMM-TD is preferably used as an efficient method of computing geodesic distances.

In a stage S7, MDS is used to measure dissimilarity in the distance matrix and thereby express the geodesic distances in a low dimensional Euclidean representation. Finally in a stage S8, the face as represented in low dimensional Euclidean representation can be compared with other faces by various distance calculation techniques. As discussed above, a preferred method uses the first m eigenvalues obtained from the MDS procedure to provide coordinates in a low-dimensional feature space. In the present embodiments the first three eigenvalues are taken and plotted on a three-dimensional feature space. Although the dominant eigenvalues do not describe the canonical form entirely, similar faces nevertheless form recognizable clusters in the feature space and thus allow matching.

Experimental Results

Four experiments were performed in order to evaluate the approach and validate the present embodiments. Three databases were used:

I. A database[1] of 3D facial surfaces obtained by a simple 3D scanner of the kind described above and shown in FIG. 13. The database consisted of 6 subjects a . . . f including one artificial face (subject b) and 5 human faces.

[1] The database is available from http://www.cs.technion.ac.il/~zgil, courtesy of Gil Zigelman.

II. The Yale Face Database B[2]. The database consists of high-resolution grayscale images of 10 subjects of both Caucasian and Asian type, taken in controlled illumination conditions. Each subject was depicted in several poses (slight head rotations). 3D surface reconstruction was carried out using photometric stereo.

[2] The database is available from http://cvc.yale.edu/projects/yalefacesB/yalefacesB.html III. A Database of high-resolution facial surfaces and textures of human subjects with different facial expressions, obtained using the 3D scanner.

Scanned Surfaces With Artificial Facial Expressions

The first experiment was performed on database I (FIG. 13) and was intended to test algorithm sensitivity to artificial facial expressions.

Figure 13:
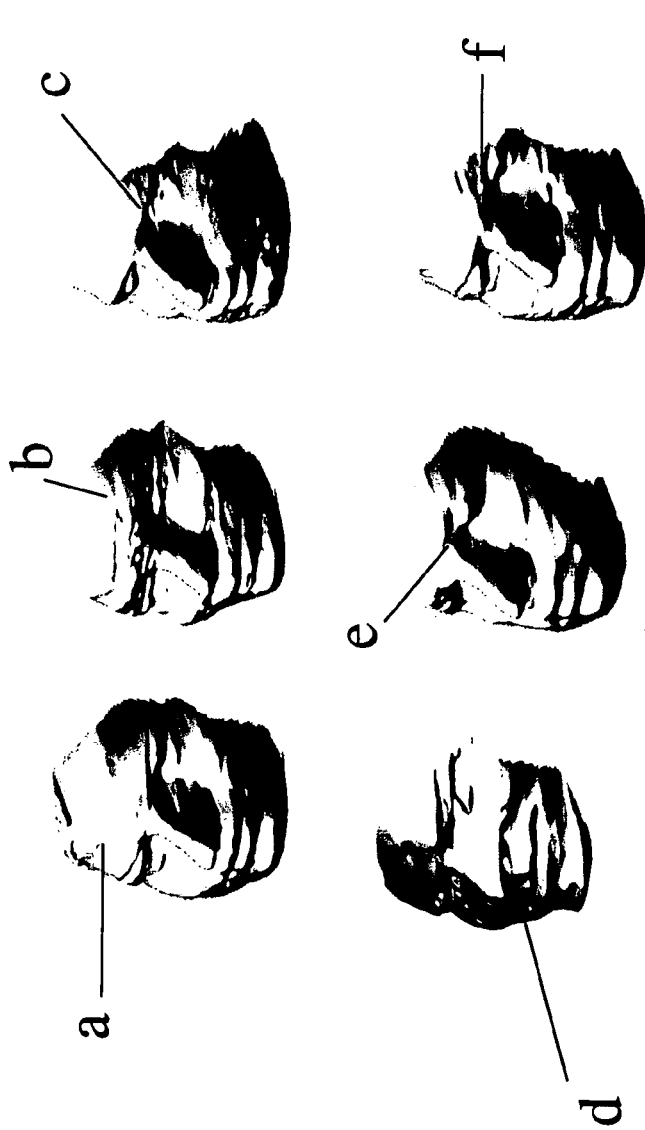
FIG. 13 is a database of six faces, used as the subject of the first experiment.
Figure 14:
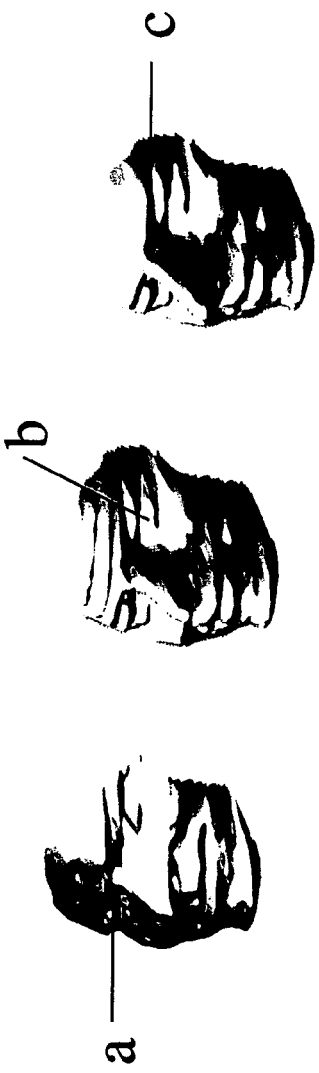
FIG. 14 shows one of the faces of FIG. 1, a variation of the face to simulate change in expression, and a further variation to illustrate a change in a major feature.

Reference is now made to FIG. 14 which shows how one of the faces of FIG. 13 was deformed to simulate facial expressions. Face a is undeformed face d of FIG. 13, and faces b and c are different deformations applied thereto. In b, the forehead, cheek and chins of subject d were deformed, simulating different facial expressions of the same subject. In c, a feature, the nose, was substituted with that of a different face. The latter was applied to test algorithm sensitivity to major feature alteration. It is emphasized that these deformations were not isometric.

The surfaces were scaled to the size 60×95 and downsampled to 400 points using Voronoi sampling. Afterwards, the geodesic distance from each point was computed using FMM-TD and multidimensional scaling was applied to the distance matrix.

Figure 15:
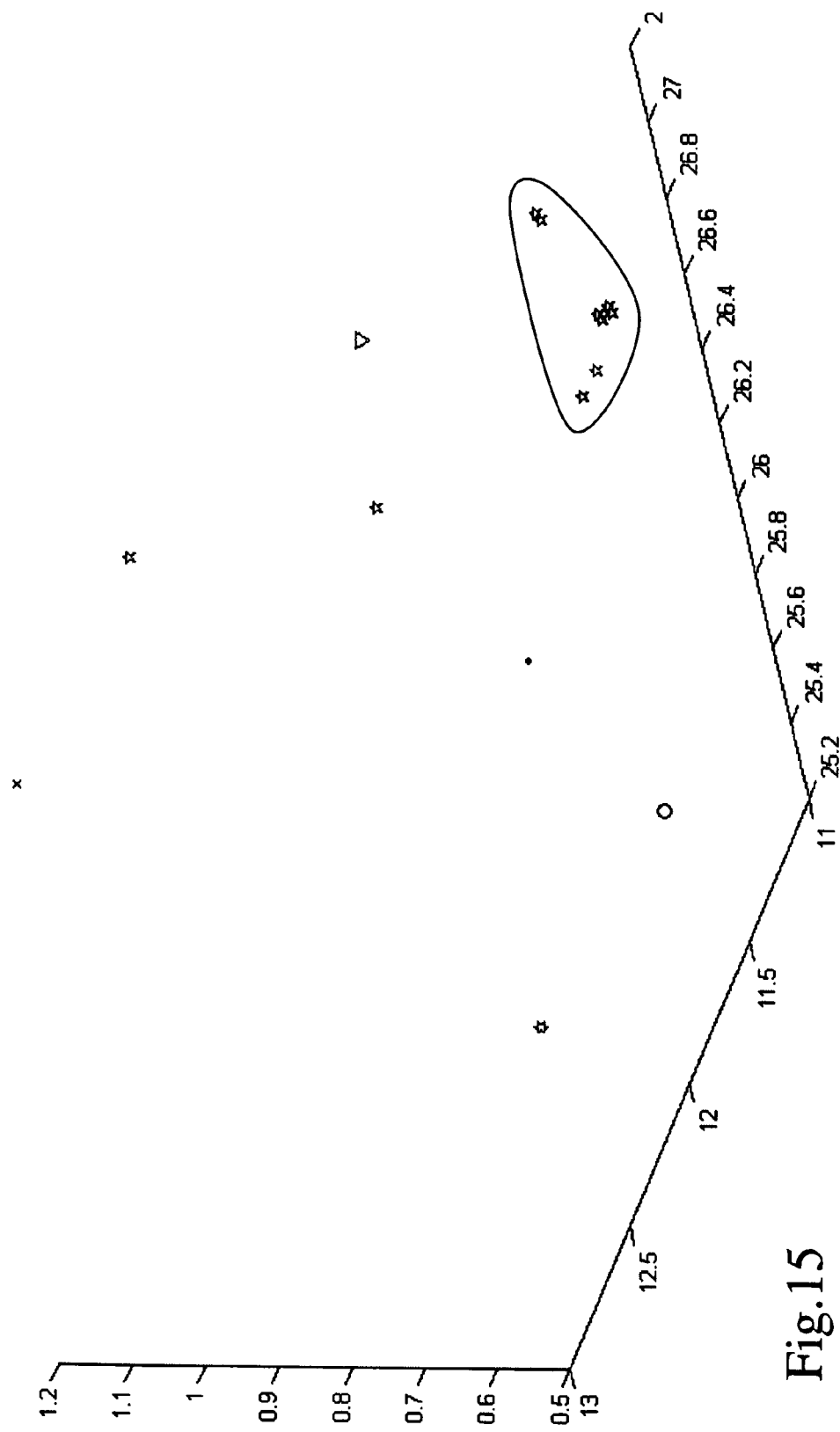
FIG. 15 is a graph showing results of the first experiment plotted onto a 3-dimensional feature space. Faces differing only by a change in expression form a cluster on the feature space whereas faces differing by a change in a major feature are distant.

Reference is now made to FIG. 15, which is a graph of a 3-dimensional feature space for matching. More specifically, the graph of FIG. 15 depicts the feature-space representation on which the first 3 eigenvalues obtained by MDS may be plotted. Each point in the feature space corresponds to one of the faces in FIGS. 13 and 14, viz A (dot), B (circle), C (cross), D (pentagram), E (triangle) and F (hexagram). It can be seen that face deformations, though not purely isometric, produce closely located points that form clusters. On the other hand, faces obtained by feature substitution are far from the original face of subject D.

Photometric Stereo

The second experiment was performed on database II. The aims of the experiment were to determine the feasibility of using photometric stereo for 3D surface acquisition and the sensitivity of the algorithm to head rotations.

Figure 16:
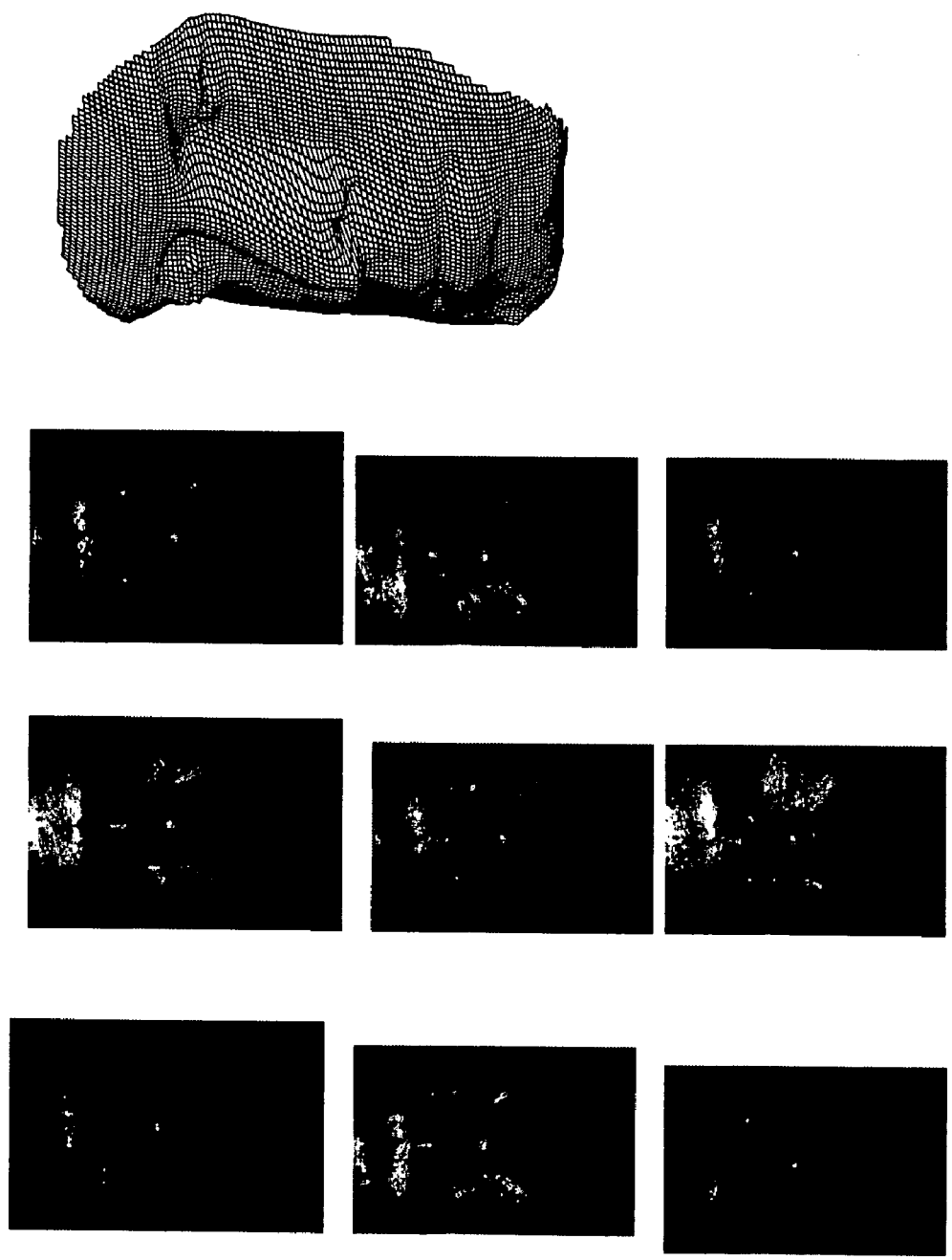
FIG. 16 illustrates nine different illuminations of a given face and their reconstruction, using photometric stereo, into a manifold by solution of the Poisson equation.

It appears that faithful surface reconstruction from photometric stereo demands a large number of different illumination directions. The reason is primarily due to deviations in practice from the Lambertian model (especially notable in forehead, hair and eyes) and slight subject displacement during image acquisition (e.g. eye blinking). Reference is now made to FIG. 16, which shows nine different illuminations of the same face and a least squares surface reconstruction made by surface reconstruction from all nine of the images. Nine is simply a number found empirically to be an efficient number. Smaller numbers of images resulted in less accurate surfaces and therefore less accurate recognition.

Figure 17:
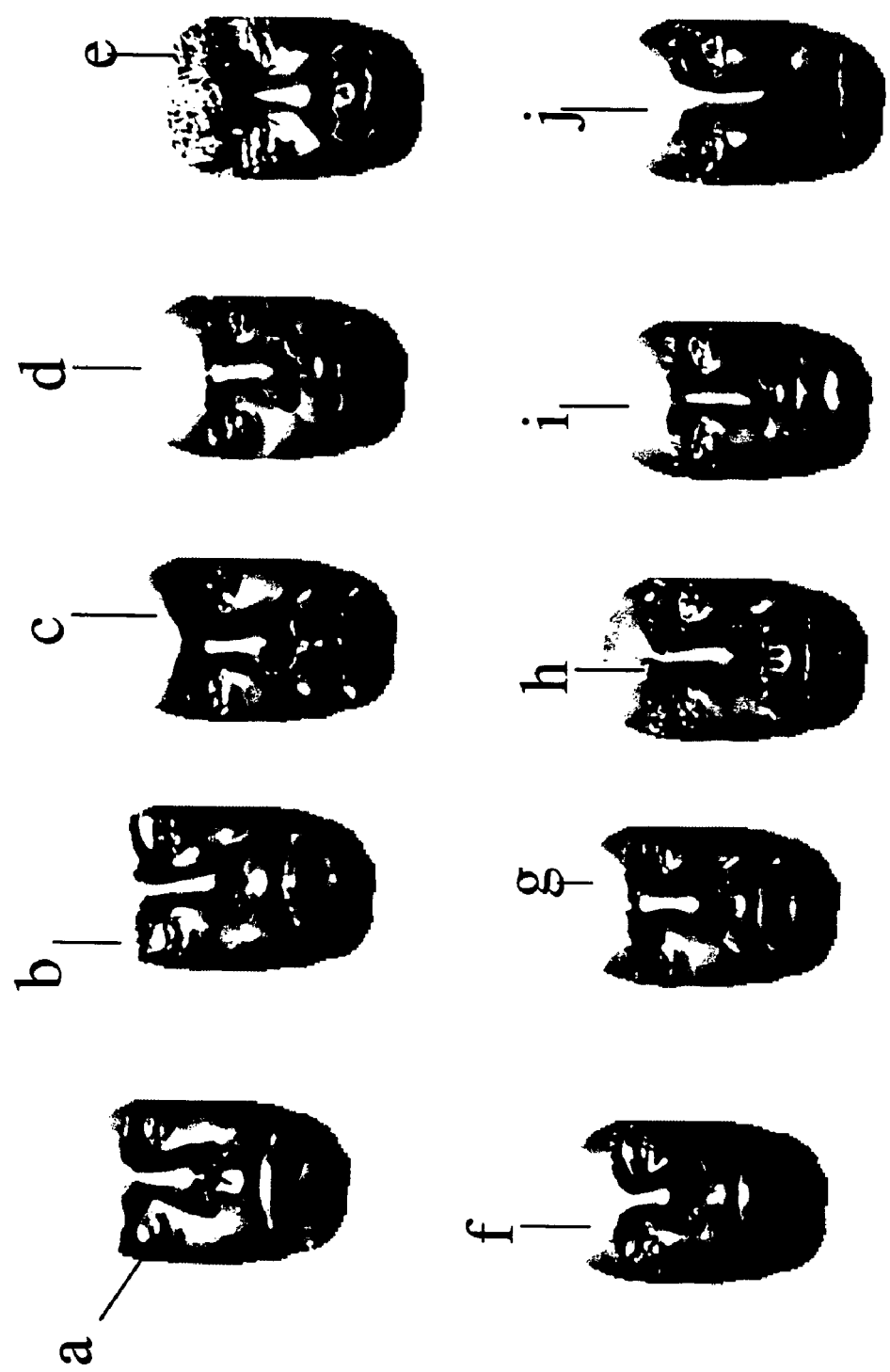
FIG. 17 is a set of ten faces each reconstructed using least squares from nine facial illuminations of a different subject for use in the second experiment.

Reference is now made to FIG. 17, which depicts a series of ten facial surfaces a-j each reconstructed from photometric stereo from nine images of respective faces. It is noted that relatively high noise appears to be inevitable when reconstructing 3D geometry from photometric stereo.

Figure 18:
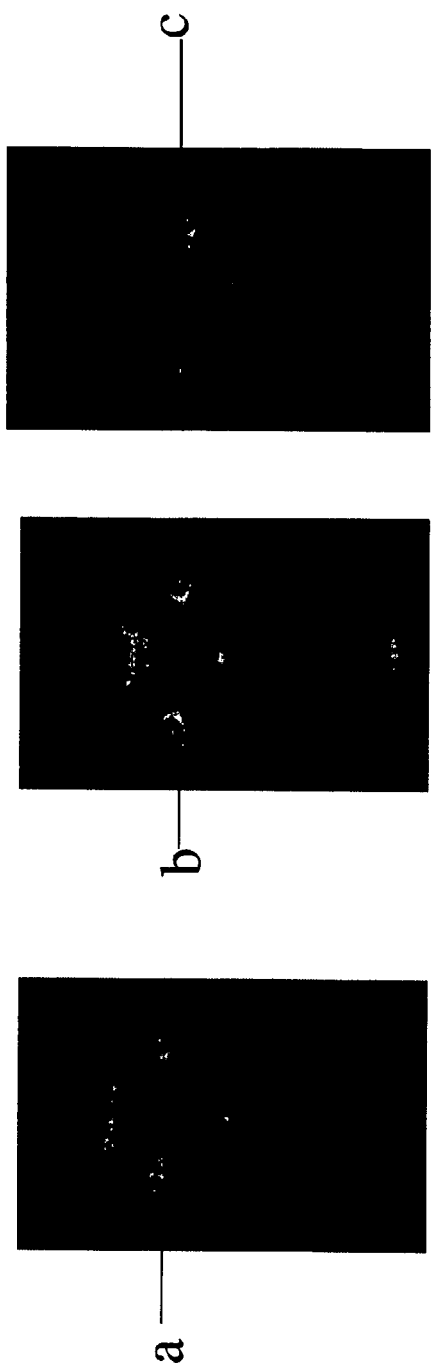
FIG. 18 is a set of images of a single subject each with a different pose, for use in experiment II.

Reference is now made to FIG. 18, which shows subject G of FIG. 17 taken at several poses. For some subjects, several poses were taken to test the recognition sensitivity to small head rotations. Since the algorithm is bending invariant, the influence of rotation (an isometric transformation) should be negligible, and all the possible deviations found seem mainly to be due to inaccurate surface reconstruction.

In the experiment, faces were manually centered according to the eye and lip locations and processing was performed in the region bounded by the facial contour. The surfaces were scaled to the size 56×80 and sampled at 400 points using Voronoi sampling. Afterwards, the distance from each point was computed using fast marching, and multidimensional scaling was applied to the distance matrix.

Figure 19:
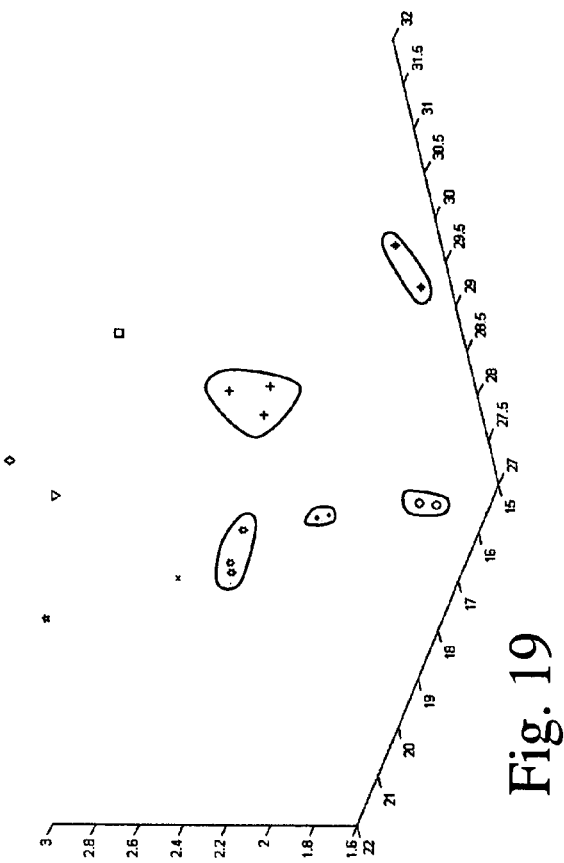
FIG. 19 is a graph showing results of the second experiment, plotted on a 3-dimensional feature space. Different poses of the same subject form clusters.

Reference is now made to FIG. 19, which is a simplified graph depicting the feature-space representation using the first 3 eigenvalues obtained by singular value decomposition of the faces of FIG. 17, some of them in several poses as exemplified by FIG. 18. A (dot), B (circle), C (cross), D (plus), E (star), F (pentagram), G (hexagram), H (diamond), I (square) and J (triangle). Different poses of subjects A, B, D, E and G form clusters. It is clear from the results of the second experiment that different poses result in relatively narrow clusters.

Surface Matching

The third experiment was performed on database I, the aim of the experiment being to compare the geometric approach to a straightforward surface comparison.

Figure 20:
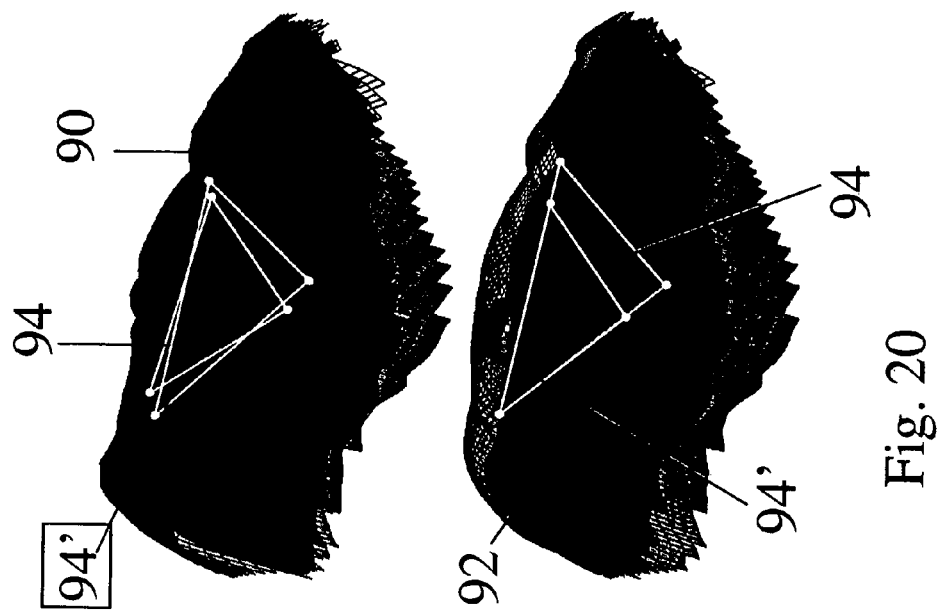
FIG. 20 is a schematic diagram illustrating an alignment process of two facial surfaces.

The experiment uses a simple $L_2$-norm-based measure for surface similarity. Reference is now made to FIG. 20, which shows two pairs of surfaces 90 and 92. Each surface has a plane 94, 94' defined by the two eyeball centers and the center of the mouth. Pair of surfaces 90 are not aligned and pair of surfaces 92 are the same as those in 90 but after alignment. In the experiment, the surfaces were aligned in two different ways:

(a) as shown in FIG. 20, so that the planes 94, 94' formed by the two eyeball centers and the center of the mouth in the two surfaces coincided, and (b) by finding the Euclidean transformation $$Rx+b \qquad (14)$$

in which R is a rotation matrix, and b is a translation vector, so as to minimize the sum of Euclidean distances between the points on the two surfaces, that is the rotation is selected that minimizes the surface dissimilarity (in this case, the approximated volume in the gap between two aligned surfaces). Optimal alignment was found by the gradient descent algorithm with numeric gradient computation.

Once an optimal alignment is found, the proximity of surfaces is computed by integrating the volume of the gap between the two surfaces. Such an approach follows the global surface matching idea disclosed in C. Beumier and M. P. Acheroy, Automatic Face Authentication from 3D Surface, *British Machine Vision Conference BMVC* 98, University of Southampton UK, 14-17 September, 1998, pp 449-458.", 1998, the contents of which are hereby incorporated by reference.

For visualization purposes and for displaying the subjects as points in 3D space, a matrix D is formed of the distances between the surfaces according to $$d_{ij} = \sum_{k=1}^{N} \|x_k^i - x_k^j\|_2 \qquad (15)$$

where $\{x_k^i\}_{k=1}^{N}$ are the N points forming the i-th surface, and applying MDS to D. The first three dominant eigenvalues were taken in order to obtain the representation of the proximity pattern in a three-dimensional Euclidean space.

Figure 21:
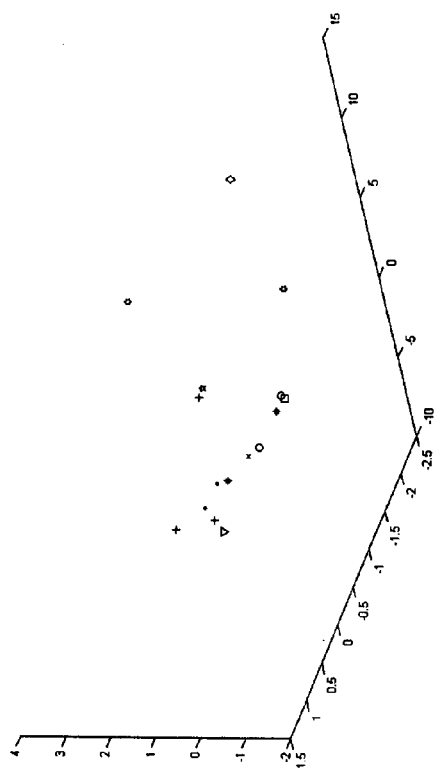
FIG. 21 is a graph showing the results of the third experiment without alignment, plotted on a three-dimensional feature space. No recognizable clusters appear.
Figure 22:
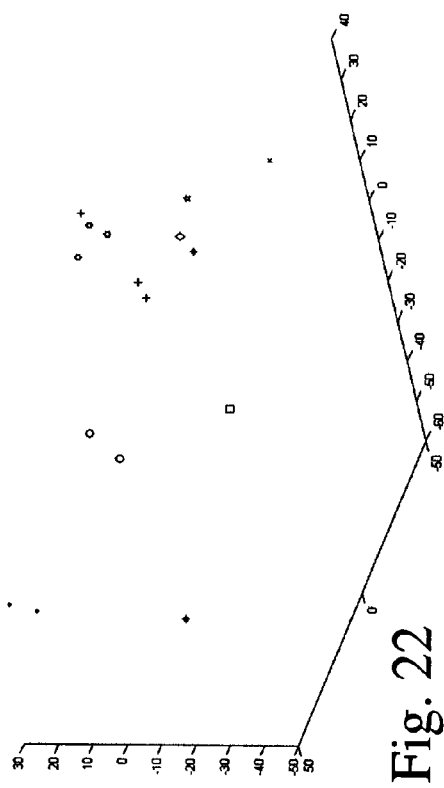
FIG. 22 is a graph showing the results of the third experiment carried out with optimal alignment, plotted on a three-dimensional feature space. Clustering is present but indistinct.

Reference is now made to FIGS. 21 and 22, which are two graphs summing up the results of this third experiment. It is apparent that the straightforward comparison of manifolds after alignment is sensitive to facial expressions and fails to distinguish between different expressions of the same subject on the one hand and different subjects on the other hand.

More particularly, FIGS. 21 and 22 show that unlike the geodesic distances, $L_2$ distances between the surfaces do not distinguish between faces, even using an optimal surface alignment. Different expressions and head poses of the same subject do not form recognizable clusters. The reason is the fact that the straightforward comparison does not take into consideration the geometry of the facial surfaces.

FIG. 21 shows the results of an $L_2$-based algorithm for alignment according to 3 points for the set of faces of FIG. 17 and some of the faces showing different expressions: A (dot), B (circle), C (cross), D (plus), E (star), F (pentagram), G (hexagram), H (diamond), I (square) and J (triangle). No clusters are recognizable.

FIG. 22 uses an $L_2$-based algorithm with optimal alignment for the same set of faces: A (dot), B (circle), C (cross), D (plus), E (star), F (pentagram), G (hexagram), H (diamond), I (square) and J (triangle). Again, no distinct clusters appear.

Human Subjects With Real Expressions

A fourth experiment was performed, this time using database III. The main goal was testing the algorithm in field conditions, on subjects with real facial expressions. Three subjects from database III are shown in FIG. 23, and FIG. 24 shows a single subject with three different expressions.

Reference is now made to FIGS. 25-28 which show preprocessing of the faces to extract only features that are relevant. The faces were processed in order to extract the relevant features only. A geodesic mask was applied both to the texture and the depth maps. The mask was obtained by computing a ball of constant radius—in the geodesic sense—around the tip of the nose. In the experiment the nose location was found manually. FIGS. 25 and 26 are texture maps, and FIGS. 27 and 28 are depth maps. FIGS. 25 and 27 show texture and depth maps respectively before application of the mask and FIGS. 26 and 28 show texture and depth maps respectively after application of the mask.

Figure 30:
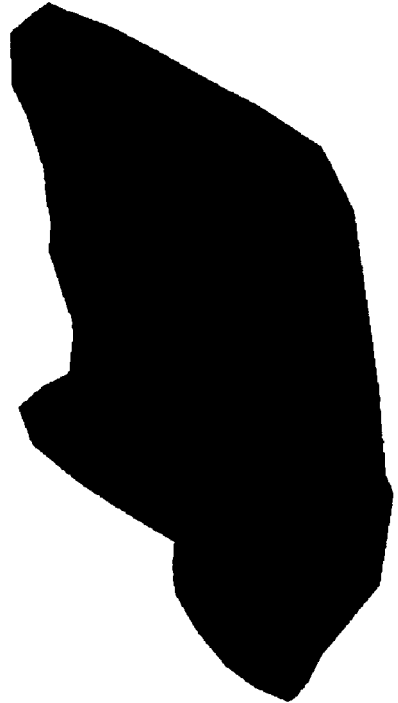
FIG. 30 shows the manifold of FIG. 29 following subsampling.
Figure 31:
FIG. 31 shows the manifold of FIG. 29 reduced to canonical form.
Figure 29:
FIG. 29 shows a triangulated manifold as obtained directly from 3D topographical image data.

Reference is now made to FIGS. 29, 30 and 31, which respectively show mesh processing stages of the present embodiments. FIG. 29 shows the high-resolution triangulated manifold, FIG. 30 shows the downsampled version of the manifold and FIG. 31 shows the surface in canonical form.

The minimal mean squared distance measure yielded much better results applied to the canonical surface rather than to the original manifold. Currently, the minimal mean squared distance measure appears to be computationally expensive. Canonical form comparison, based on central moments which are much simpler to compute, yielded a bit less accurate results than the minimal squared distance, but still provided a good measure for face similarity.

The classical scaling algorithm was used for creating the canonical forms. The present inventors have seen no significant improvement over the classical scaling algorithm in using the least-square MDS algorithm. 250-500 subsamples have been found to give sufficient accuracy while keeping the computational complexity relatively low.

It is noted that the present embodiments yield poor results when considering strong non-isometric deformations of the facial surface such as inflated cheeks or open mouth. Limiting the region of interest to the upper part of the face, being a hard region and containing substantially rigid features, on the preprocessing stage yields significantly better results under the above conditions.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. Apparatus for processing 3-dimensional data of a geometric body for matching, said geometric body comprising an outer surface having a topography, said apparatus comprising:
    a geodesic converter, configured for receiving 3-dimensional topographical data of said geometric body, and for converting said 3-dimensional topographical data into a series of geodesic distances between pairs of points of said topographical data on a manifold, said geodesic distances being measured over said manifold of said geometric body, and
    a bending invariant multi-dimensional scaler, connected subsequently to said geodesic converter, for forming a bending-invariant low dimensional Euclidean representation of said series of geodesic distances over said manifold, said bending-invariant low dimensional Euclidean representation providing a bending invariant representation of said geometric body suitable for matching with other geometric shapes.

2. Apparatus according to claim 1, further comprising a subsampler located prior to said geodesic converter, configured to subsample said 3-dimensional topographical data, and to provide to said geodesic converter a subsampled data set.

3. Apparatus according to claim 2, wherein said three-dimensional topographical data comprises a plurality of vertices and wherein said subsampler is operable to select a first vertex and to iteratively select a next vertex having a largest geodesic distance from vertices already selected, until a predetermined number of vertices has been selected.

4. Apparatus according to claim 3, wherein said subsampler is operable to use the fast marching method for triangulated domains to calculate geodesic distances between vertices for said iterative selection.

5. Apparatus according to claim 2, wherein said geometric body is a face, having soft geometric regions, being regions of said face susceptible to short term geometric changes, and hard geometric regions, being regions substantially insusceptible to said short term geometric changes, said apparatus comprising a preprocessor, located prior to said subsampler, for removing said soft geometric regions from said face.

6. Apparatus according to claim 5, wherein said preprocessor is operable to identify said soft regions by identification of an orientation point on said face.

7. Apparatus according to claim 6, wherein said orientation point is at least one of a nose tip, a pair of eyeball centers and a mouth center.

8. Apparatus according to claim 5, wherein said preprocessor is further operable to center said face.

9. Apparatus according to claim 5, wherein said preprocessor is further operable to crop said face.

10. Apparatus according to claim 5, wherein said preprocessor is operable to carry out removal of said soft regions by application of a geodesic mask.

11. Apparatus according to claim 1, wherein said geodesic converter is operable to use the fast marching method for triangulated domains to calculate said geodesic distances.

12. Apparatus according to claim 1, further comprising a triangulator for forming said topographical data from scan data of a geometric body.

13. Apparatus according to claim 12, further operable to embed said topographical data into a space of higher than two dimensions, thereby to include additional information with said topographical information.

14. Apparatus according to claim 13, wherein said additional information is any one of a group comprising texture information, albedo information, grayscale information, and color information.

15. Apparatus according to claim 1, wherein said subsampler comprises an optimizer for allowing a user to select an optimum subsampling level by defining a trade-off between calculation complexity and representation accuracy.

16. Apparatus according to claim 1, wherein said multi-dimensional scalar is configured such that said Euclidean representation comprises a predetermined number of eigenvalues extractable to be used as co-ordinates in a feature space.

17. Apparatus according to claim 16, wherein said predetermined number of eigenvalues is at least three, and said feature space has a number of dimensions corresponding to said predetermined number.

18. A method of image preprocessing of three-dimensional topographical data of a manifold surface having a topography for subsequent classification, the method comprising:
providing image preprocessing hardware; and
within said image preprocessing hardware:
placing said three-dimensional topographical data over a two-dimensional manifold to form said manifold surface having a topography,
converting said manifold into a series of geodesic distances between pairs of points over said manifold, said geodesic distances being measured over said topography of said manifold,
generating a matrix of geodesic distances over said manifold to selected vertices of said manifold, and
using multi-dimensional scaling to reduce said matrix to a bending-invariant canonical representation in a low-dimensional Euclidean space, thereby to provide a representation suitable for subsequent classification.

19. The method of claim 18, further comprising selecting said vertices for generating said matrix of geodesic distances by a procedure comprising iteratively selecting a next vertex having a largest geodesic distance from vertices already selected, until a predetermined number of vertices has been selected.

20. The method of claim 19, comprising determining geodesic distances for said procedure using the fast marching method for triangulated domains.

21. The method of claim 18, wherein said three-dimensional topographical data is a representation of a face, and further comprising cropping said face to exclude parts of said face being susceptible to short term changes, thereby to render said subsequent classification substantially invariant to said short term changes.

22. A method of classifying images of three-dimensional bodies having surface topographies, the method comprising:
providing image processing hardware; and
within said image processing hardware:
obtaining bending invariant representations of said three dimensional bodies as canonical form representations derived from geodesic distances between selected sample points taken from surfaces of said bodies, said geodesic distances being measured over said respective surface topographies of said three-dimensional bodies;
from each representation deriving co-ordinates on a feature space, and
classifying said bodies according to clustering on said feature space.

23. The method of claim 22, wherein said deriving co-ordinates comprises deriving first m eigenvalues from respective canonical form representations, where n is a predetermined number, and using said m eigenvalues to provide said co-ordinates, said feature space being constructed to have n dimensions.

24. The method of claim 23, wherein n is at least three.

25. The method of claim 23, wherein n is three.

26. Apparatus for processing 3-dimensional data of a geometric body having a three-dimensional surface topography, said processing being for matching with other bodies, said apparatus comprising:
a geodesic converter, configured for receiving 3-dimensional topographical data of said geometric body as a 2-dimensional manifold representing said surface, and for converting said manifold into a series of geodesic distances between pairs of points over said manifold, said geodesic distances being measured over a topography of said manifold, thereby to provide a Euclidian bending invariant representation of said geometric body suitable for matching with other geometric bodies, and wherein said geometric body for matching and said other geometric bodies comprises a face.

27. Apparatus according to claim 26, wherein said bending invariant representation permits matching of faces independently of facial expressions.

* * * * *